United States Patent [19]
Mikami et al.

[11] Patent Number: 4,844,190
[45] Date of Patent: Jul. 4, 1989

[54] COMBINATIONAL WEIGHER FOR MULTIPLE OPERATIONS

[75] Inventors: Yoshiharu Mikami; Michihiro Kubo; Takashi Kabumoto, all of Shiga, Japan

[73] Assignee: Ishida Scales Manufacturing Company, Ltd., Kyoto, Japan

[21] Appl. No.: 189,767

[22] Filed: May 3, 1988

[51] Int. Cl.⁴ .................. G01G 13/00; G01G 19/52
[52] U.S. Cl. ................................. 177/25.18; 177/50
[58] Field of Search ............... 177/1, 25.18, 70, 50

[56] References Cited

U.S. PATENT DOCUMENTS

| | | | |
|---|---|---|---|
| 4,341,274 | 7/1982 | Hirano et al. | 177/25.18 |
| 4,529,049 | 7/1985 | Fukuda | 177/25.18 X |
| 4,534,428 | 8/1985 | Mosher et al. | 177/1 |
| 4,676,325 | 6/1987 | Yamano et al. | 177/25.18 X |

Primary Examiner—George H. Miller, Jr.
Attorney, Agent, or Firm—Flehr, Hohbach, Test, Albritton & Herbert

[57] ABSTRACT

An automatic weigher with a plurality of article batch handling units arranged in a circular formation is controlled by a single computer to perform two or more mutually independent combinational weighing operations. In order to allow different articles to be weighed, a dispersion feeder separable into individually vibrating table units with adjustable partition walls is provided at the center. For improving the efficiency of combinational weighing operations, each article batch handling unit is provided with a memory hopper and the computer is programmed to generally give higher priority to memory hoppers than to weigh hoppers such that memory hoppers are generally more likely to be selected by the combinational computations. The computer is also programmed to identify article batch handling units in which the total weight of article batches in the memory hopper and weigh hopper is less than a critical value and to combine their article batches.

15 Claims, 19 Drawing Sheets

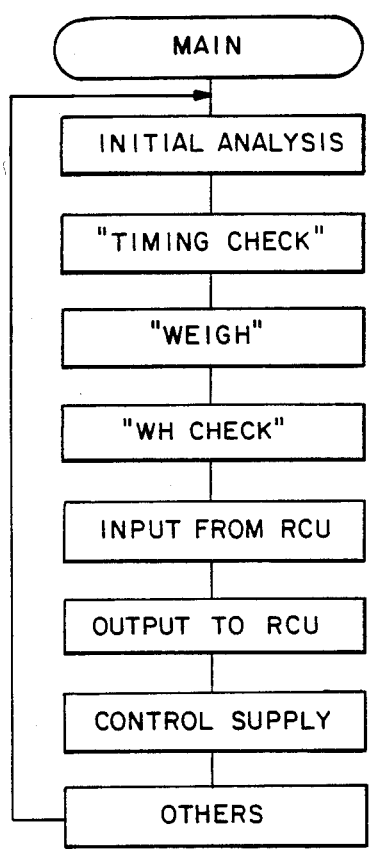
FIG.−5
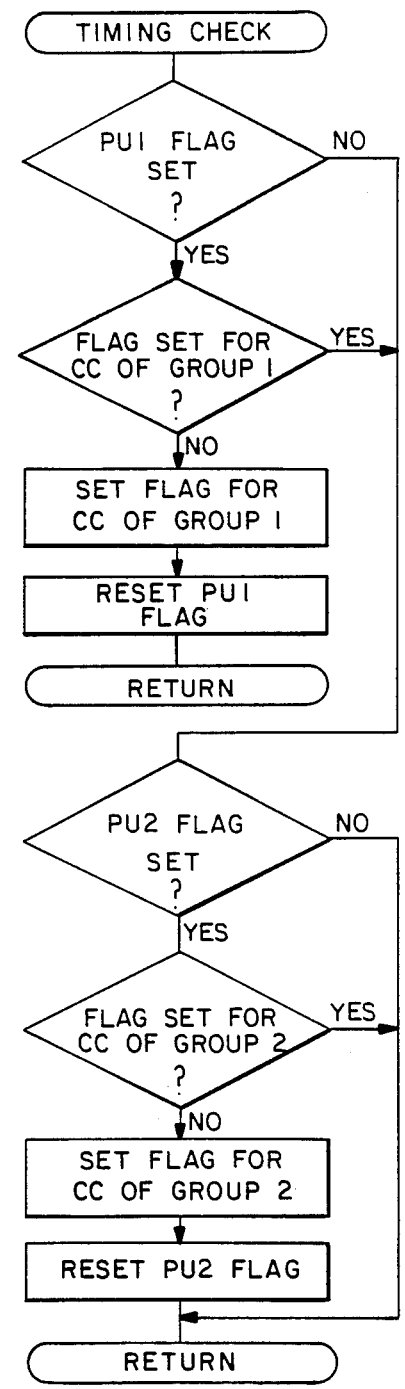
FIG.−6

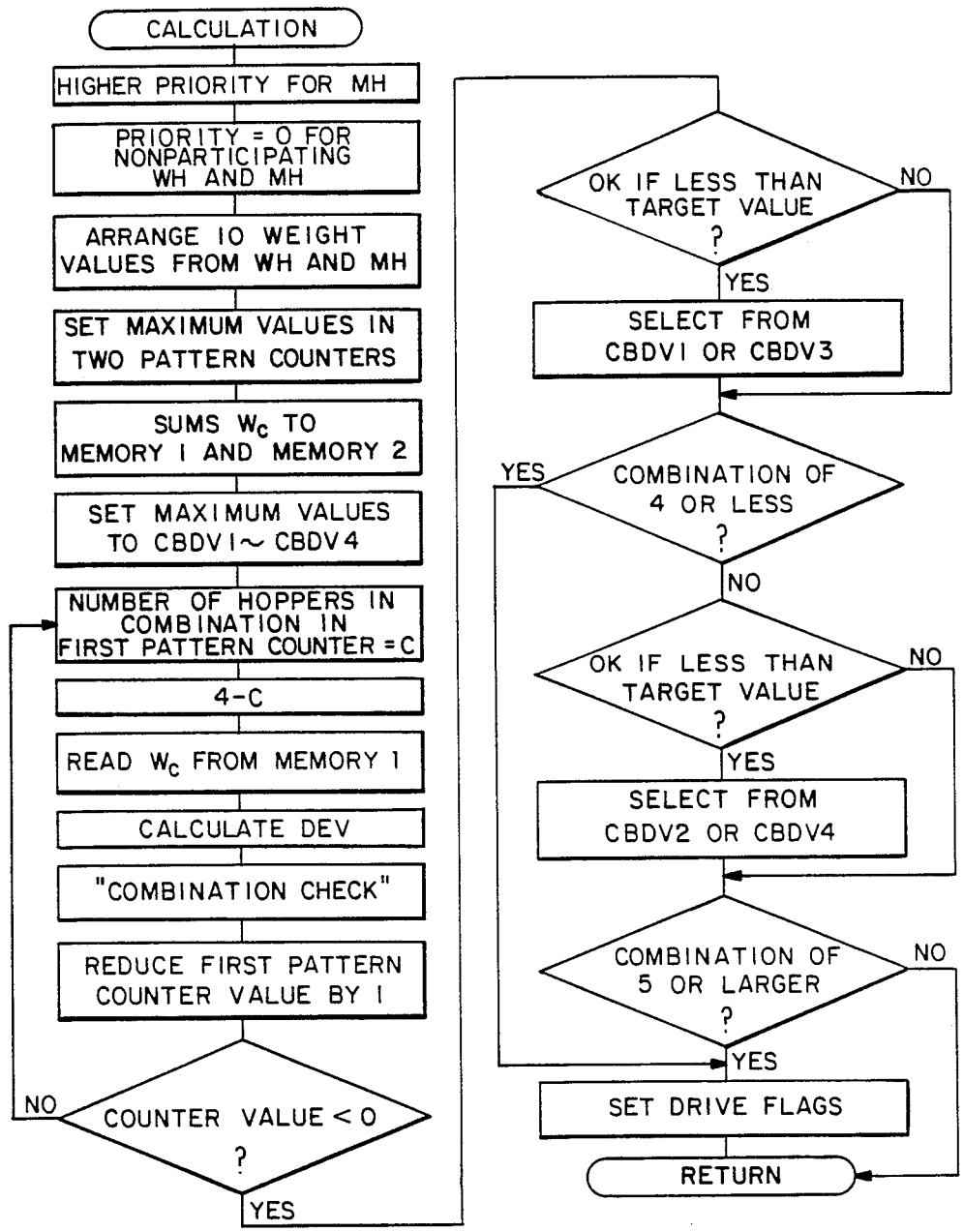
FIG.—9

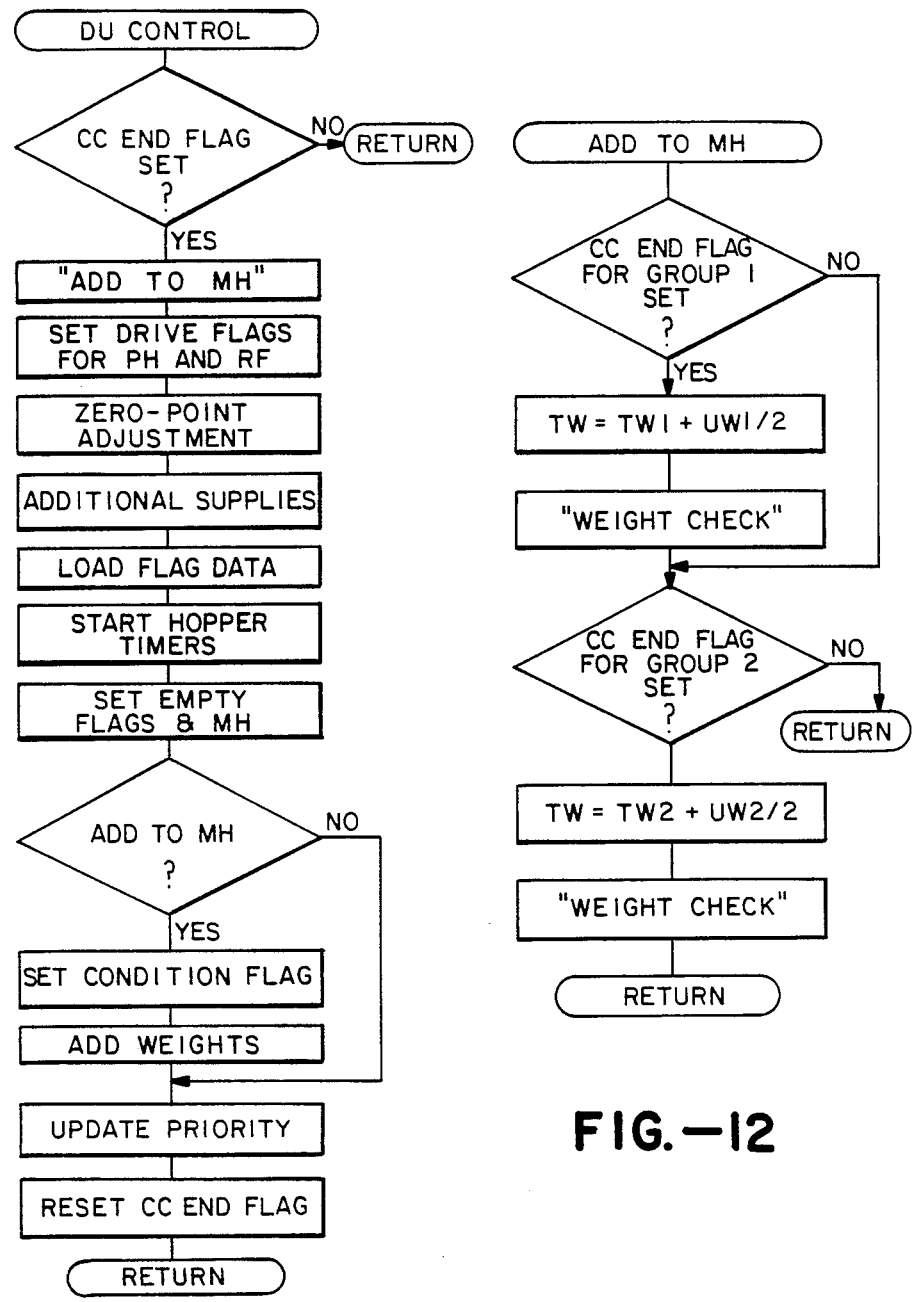
FIG.—11
FIG.—12

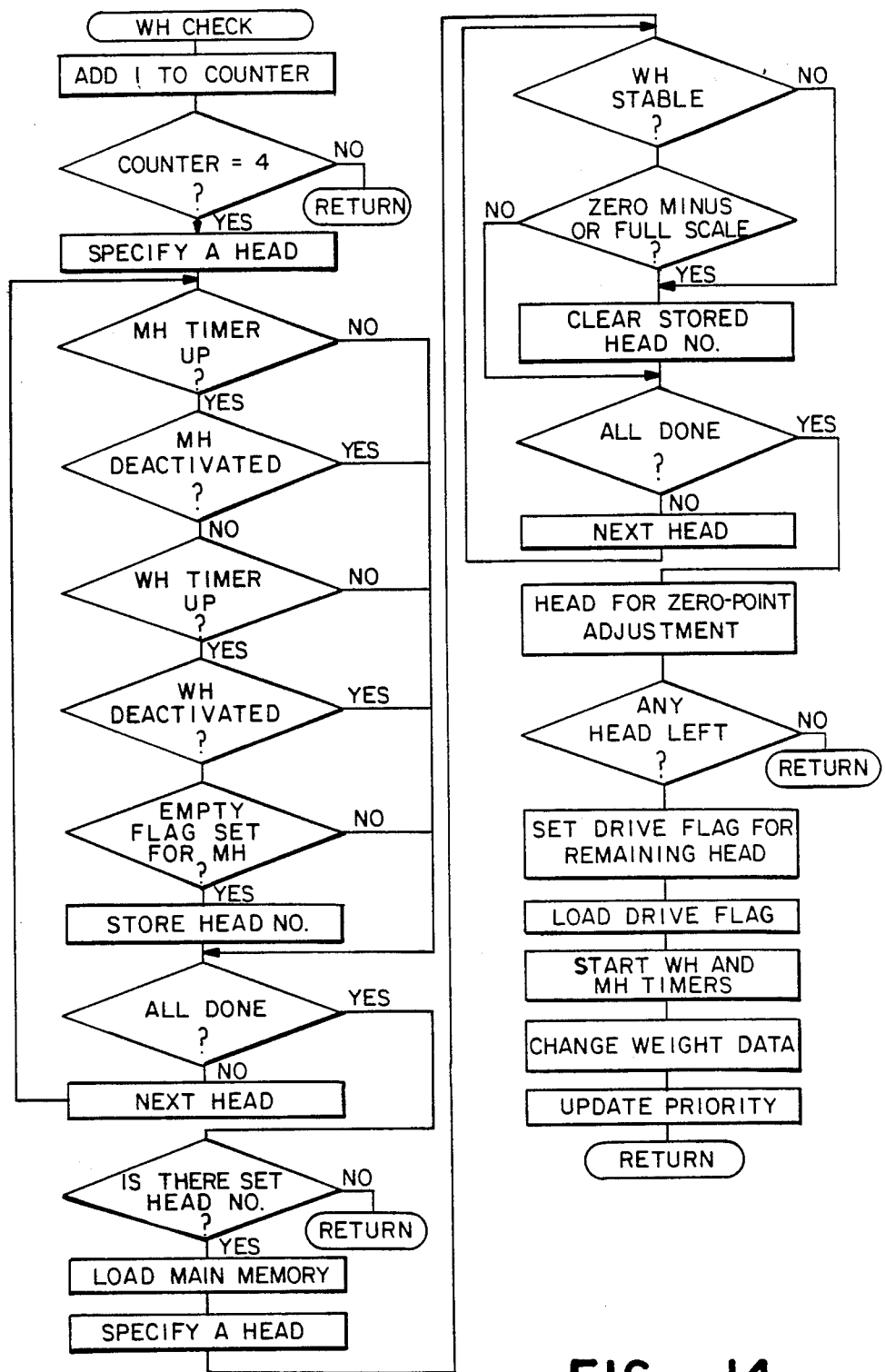
FIG. —14

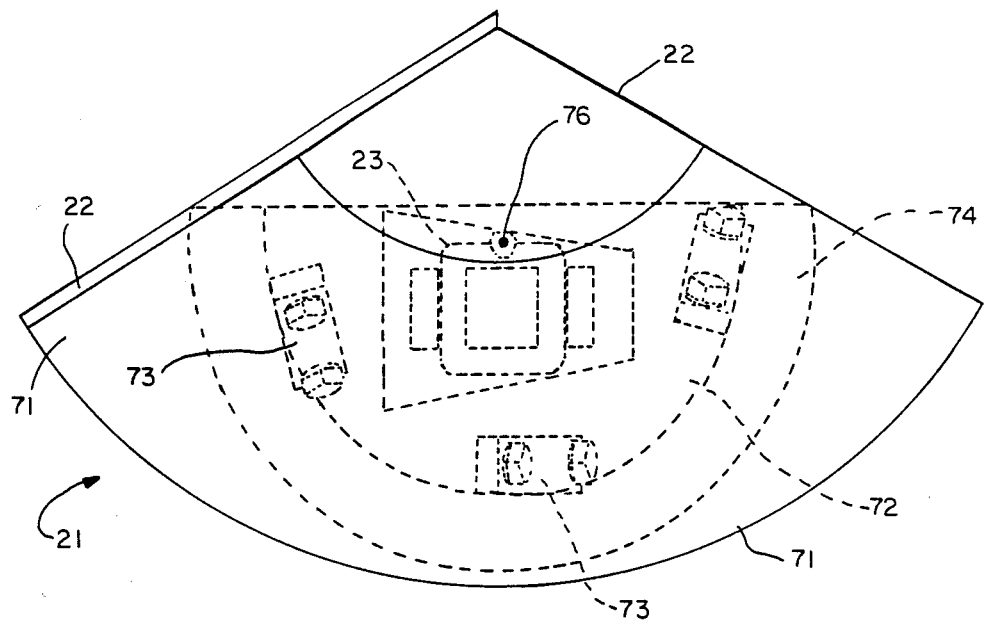
FIG.—16A
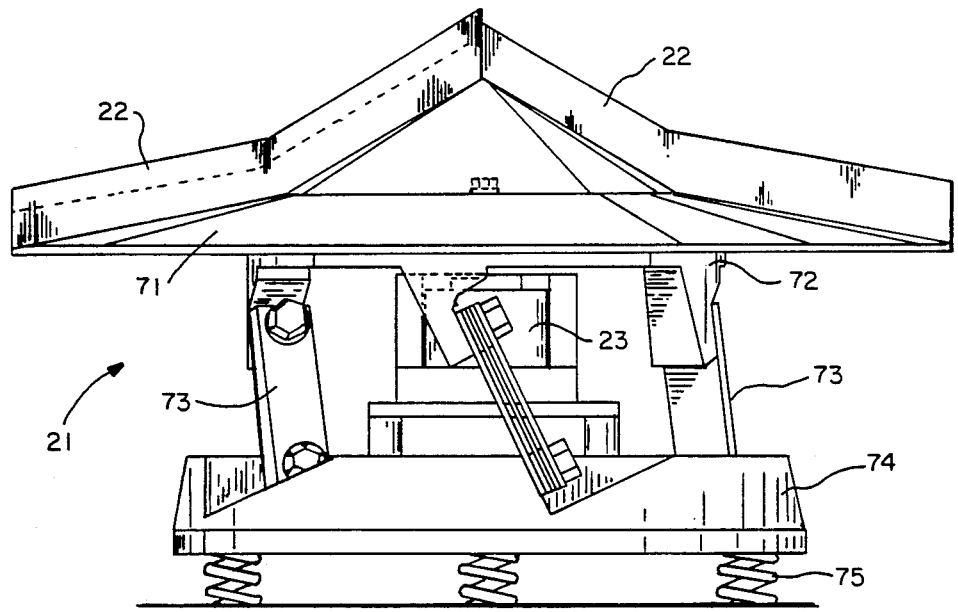
FIG.—16B

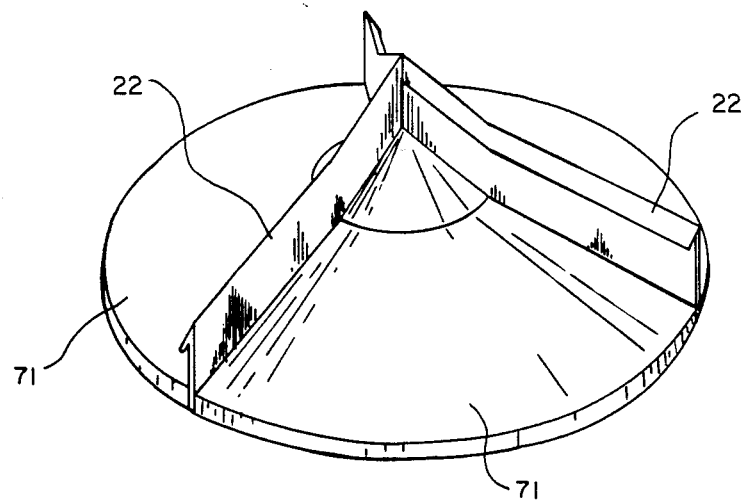
FIG.—16C
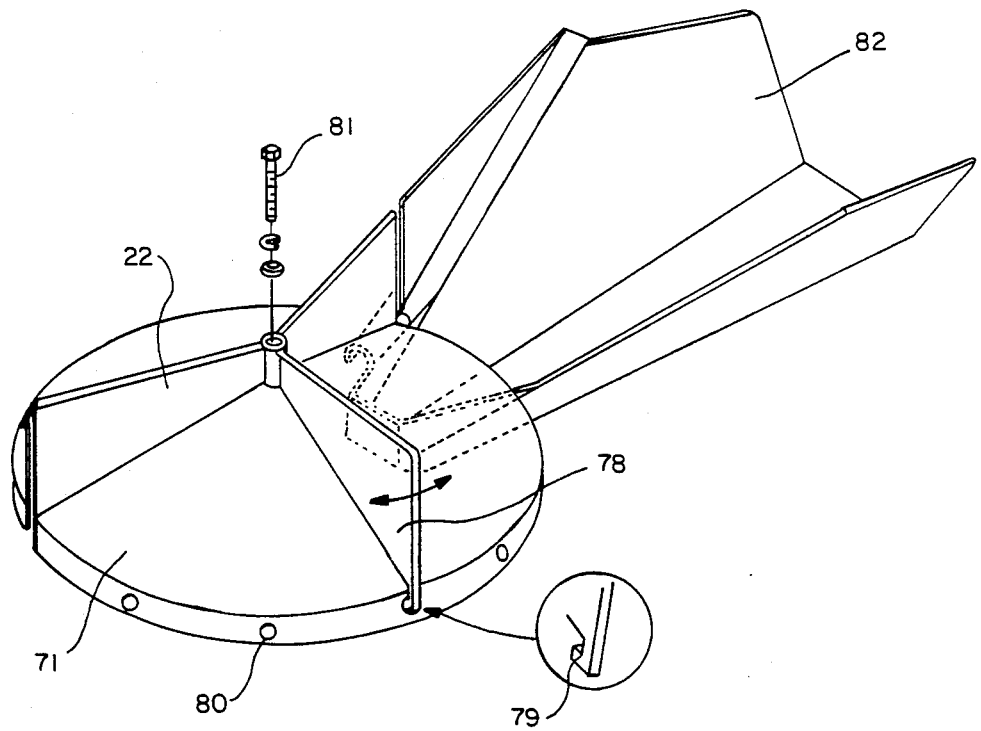
FIG.—17

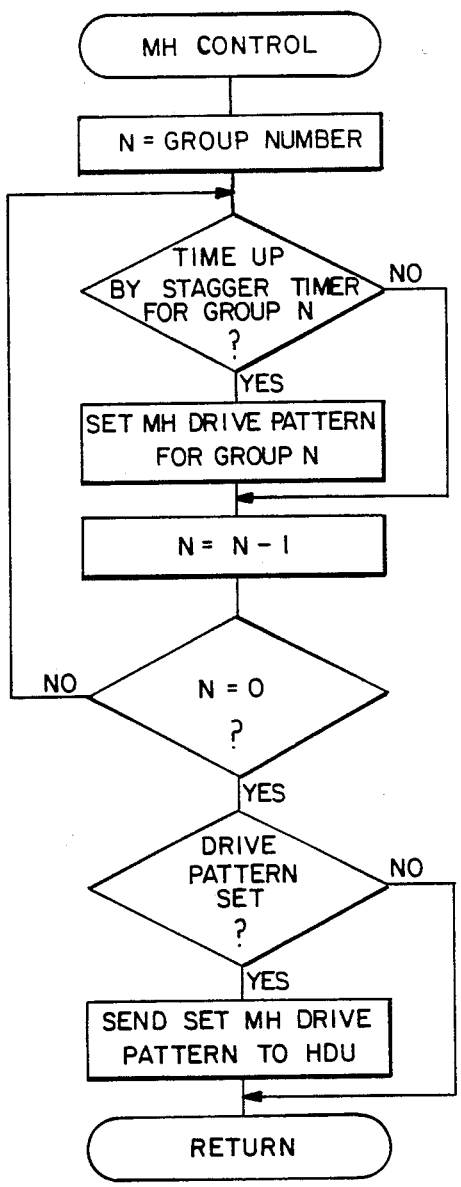
FIG.—23
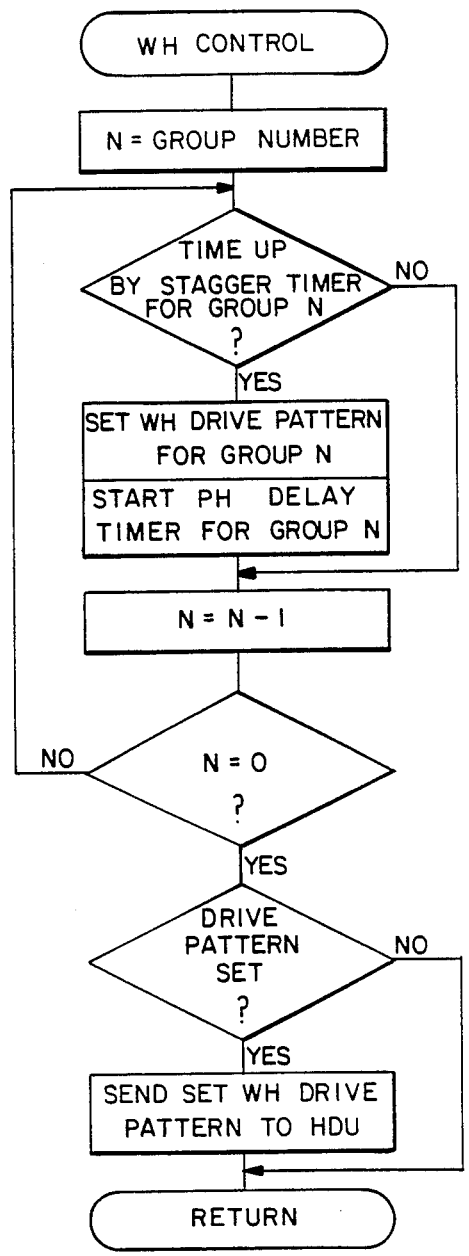
FIG.—24

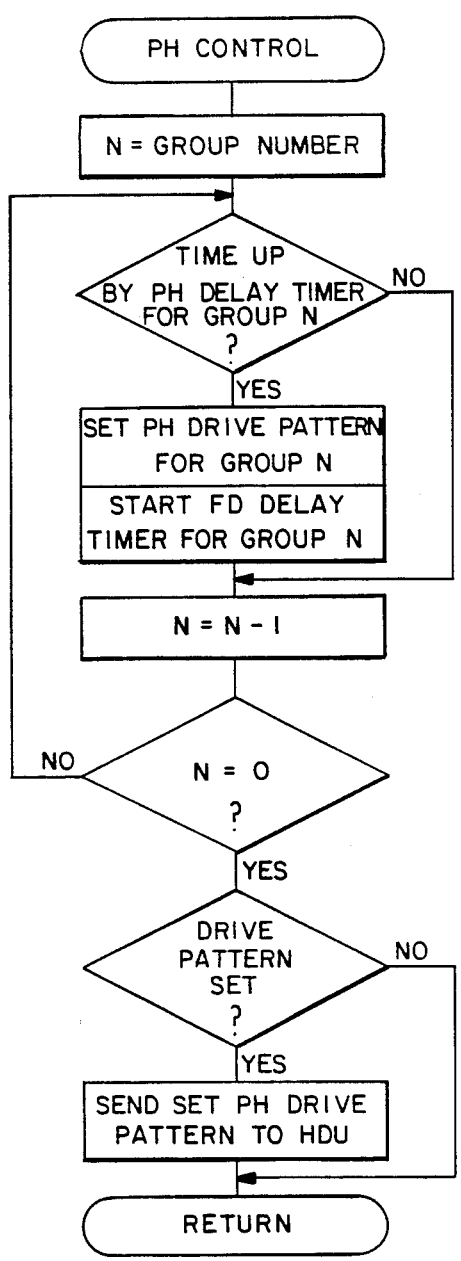
FIG.—25
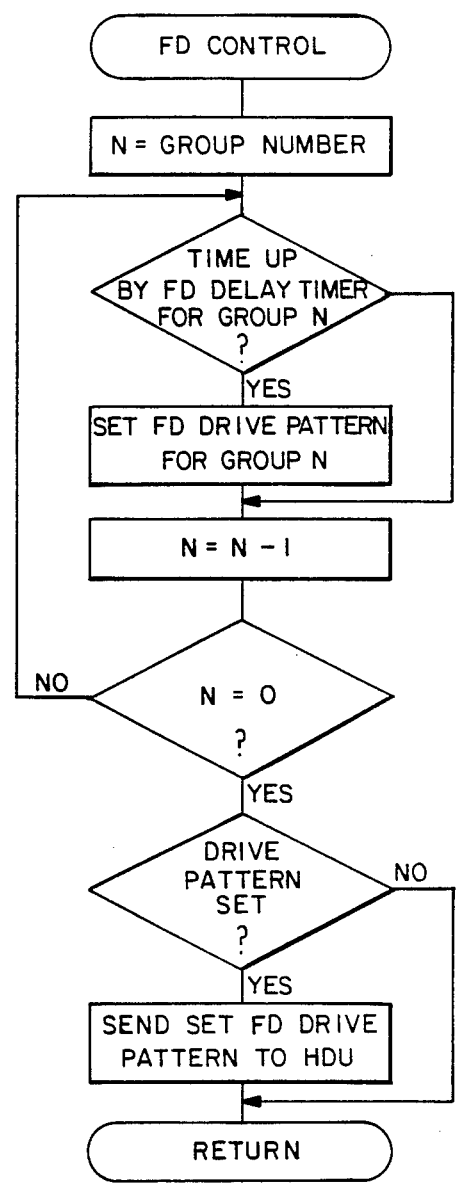
FIG.—26

COMBINATIONAL WEIGHER FOR MULTIPLE OPERATIONS

BACKGROUND OF THE INVENTION

This invention relates to an automatic combinational weigher adapted for multiple operations such that not only article batches with different target weight values but also articles of different kinds can be weighed simultaneously and more particularly to such a combinational weigher with a single computer for controlling its mutually independent operations. Additionally, this invention relates to certain new methods of efficiently operating such a weigher.

Combinational weighing means weighing articles by a plurality of weighing devices, performing arithmetic operations for combinations of weighed values and then selecting a combination according to a predetermined criterion. Its basic principle has been known and many combinational weighers of different types have been described in issued patents and commercially made available. U.S. Pat. No. 4,708,215 assigned to the present assignee, for example, discloses a computerized automatic combinational weigher of a popular type having a number of circularly arranged article batch handling units. Articles which are to be weighed may be transported by a conveyer belt and dropped onto an article feeding unit at the center and distributed thereby to the individual article batch handling units. Each article batch handling unit is provided with hoppers including one for weighing the article batch delivered to the unit and the weight values of the measured article batches are communicated to a control system such as a computer. The computer is programmed not only to compute combinations of these weight values and to select a combination according to a predetermined criterion such as the combination giving a total weight within a preselected range, but also to discharge the article batches from the selected article batch handling units for packaging. U.S. Pat. No. 4,694,920 assigned to the present assignee, for example, discloses a control unit for a combinational weigher of this type characterized as having a multi-computer structure such that many adjustments and modes of operation can be made available.

Automatic combinational weighers of this and most other types are operated primarily for weighing one kind of article at a time by setting a target weight value. If it is desired to weigh two or more different kinds of articles or if there are two or more target values for articles of the same kind, such as when 50 g, 100 g and 200 g packages of identical articles are desired, the weigher must be reset after a desired number of article batches of each type has been discharged. Alternatively, two or more weighers may be mobilized concurrently, each operating with different articles and/or a different target value. The first alternative would adversely affect the work efficiency, while the second alternative would require extra conveyer belts and other accessory units and the entire operation becomes complicated. Japanese Patent Publication Kokai No. 60-183831 discloses an automatic combinational weigher adapted for twin operations, that is, for weighing articles of the same kind concurrently with two different target weight values. If each article batch handling unit is provided with its own computer for its control as taught in U.S. Pat. No. 4,694,920, however, problems arise when the grouping of the article batch handling units for the two operations is changed. If the target weight value of the second group is to be varied according to the result of measurements by the first group, furthermore, transfers of data between the computers become time-consuming. U.S. Pat. Nos. 4,522,274, 4,549,619 and 4,658,920 assigned to the present assignee, for example, disclose technologies of using one computer to control a plurality of article batch handling units having the same operation cycle but it has not been known to control a plurality of article batch handling units for multiple non-synchronous operations by a single computer.

SUMMARY OF THE INVENTION

It is an object of the present invention to provide an automatic weigher with which two or more mutually independent combinational weighing operations can be performed simultaneously and efficiently.

It is another object of the present invention to provide such a combinational weigher for multiple operations which can weigh different articles at the same time.

It is a further object of the present invention to provide a method of efficiently operating a combinational weigher of the type using memory hoppers between weigh hoppers and a chute system.

For simultaneously carrying out two or more combinational weighing operations, the present invention provides a combinational weigher of the type having a plurality of article batch handling units arranged in a circle with an article feeding device at the center for supplying article batches to the individual article batch handling units. In order to make efficient use of the weigh hoppers in the article batch handling units, memory hoppers are provided to effectively increase the number of weight values which can participate in the combinational computations without increasing the number of article batch handling units. The multiple combinational weighing operations of the weigher is controlled by a single computer which is programmed more for its stable operation to obtain a better average performance record than for obtaining the best possible combination in each cycle. For this reason, attempts are made to prevent a situation where any memory hopper or weigh hopper fails to be selected over many cycles. Since it is generally more desirable to discharge a memory hopper than a weigh hopper, the computer is programmed to give memory hoppers extra "points" in assigning priority values to the hoppers. When the total weight of article batches in the memory and weigh hoppers belonging to the same article batch handling unit is less than a certain minimum value, the article batch in the weigh hopper is discharged into the memory hopper to make a single combined batch, thereby allowing the weigh hopper to receive a new article batch and increasing the probability of these hoppers becoming selected.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings:

FIGS. 16A, 16B and 16C are respectively a top view of one of the table units of a dispersion feeder divisible into three parts, its side view and a perspective view of the dispersion feeder table top with partition plates, FIG. 17 is a perspective view of a dispersion feeder table top equipped with an adjustable partition plate, and FIGS. 18-26 are flow charts of a program for the computer when the weigher of FIGS. 1-4 is operated to discharge articles of different types into a single packaging unit according to a preset discharge timing signal.

DETAILED DESCRIPTION OF THE INVENTION

Figure 1:
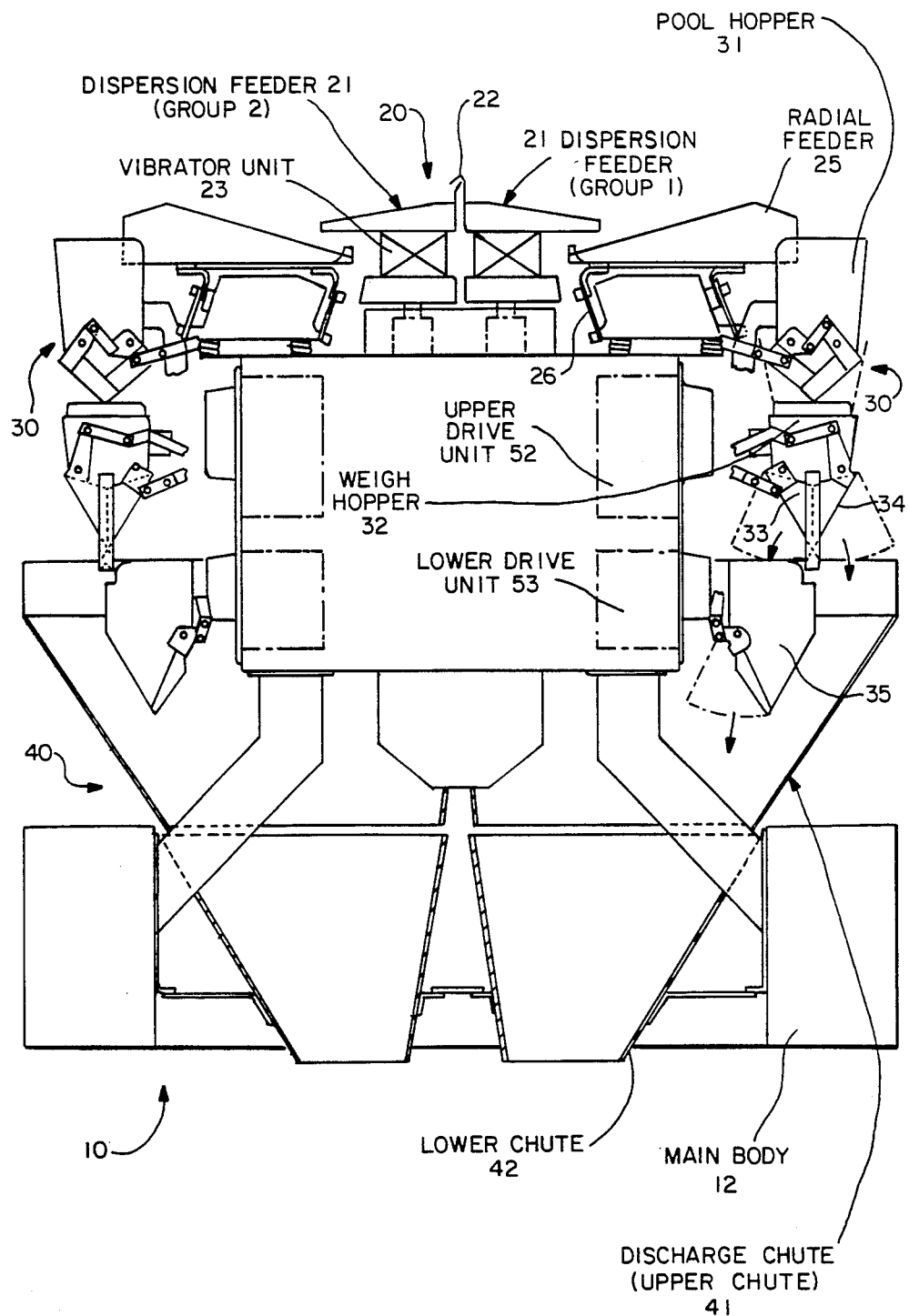
FIG. 1 is a schematic drawing for showing the structure of a combinational weigher embodying the present invention.
Figure 2:
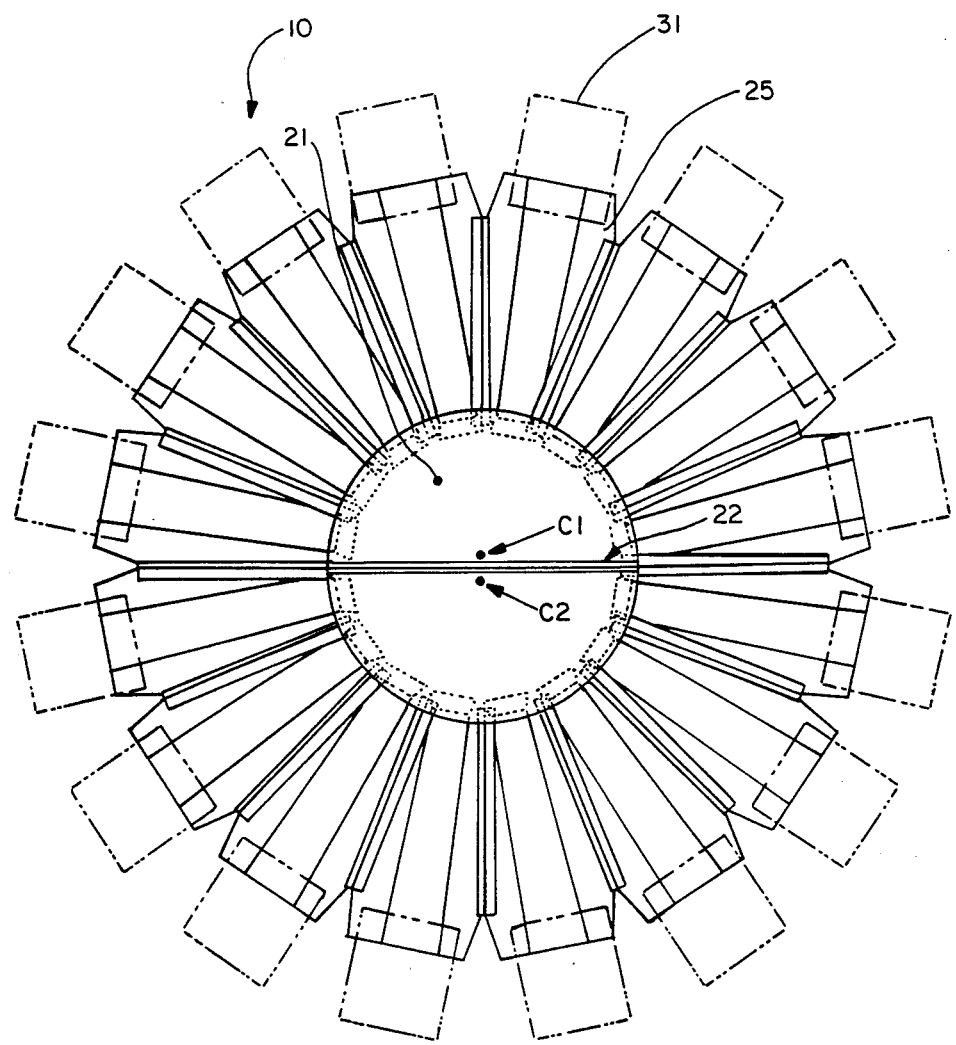
FIG. 2 is a schematic plan view of the weigher of FIG. 1 for showing the arrangement of its article batch handling units.

In FIGS. 1 and 2, numeral 10 generally indicates an automatic combinational weigher for multiple operations by way of which the present invention is described below in detail in terms not only of its mechanical and electrical structure but also of its modes of operation. The particular set of limitations related to this combinational weigher 10, however, is not intended to define the scope of the present invention but merely to be illustrative.

As shown in FIG. 2, the combinational weigher 10 is comprised of an article feeding unit 20 and sixteen article batch handling units 30 arranged in a circular formation with the article feeding unit 20 at the center. As will be described more in detail in a later paragraph, however, these sixteen article batch handling units 30 are functionally divided into two mutually independent groups of eight units each such that modes of operation such as the cycle of operation and the conditions for selecting a combination can be set independently for the two groups. For the sake of convenience of explanation, these two groups will be hereinafter referred to as Group 1 and Group 2. The weigher 10 can be operated, if so desired, such that its article batch handling units 30 belonging to Group 1 and Group 2 weigh articles of different kinds.

With reference next simultaneously to FIGS. 1 and 2, the article feeding unit 20 essentially consists of a dispersion feeder (DF) 21 at the center and radial feeders (RF) 25 individually associated to the article batch handling units 30. The dispersion feeder 21 is basically a circular table with a sloped conical top surface divided by a diametrically disposed partition 22 into two semicircular sections (or table units) corresponding respectively to Group 1 and Group 2. In FIG. 2, therefore, the eight mutually adjacent article batch handling units 30 on one side of the partition 22 are Group 1 and the remaining eight article batch handling units 30 on the other side of the partition are Group 2. Each semi-circular part of the dispersion feeder 21 is supported by its own vibrator 23 of a known type such that it can vibrate not only vertically but in the rotational direction around the center ($C_1$ or $C_2$) of the semicircle. The partition 22 serves to prevent the mixing of articles intended to be delivered to the article batch handling units 30 of different groups and comprises vertical walls of the two semi-circular sections. These walls are disposed mutually opposite and adjacent to each other. The top part of one of them is bent over the top of the other as shown schematically in FIG. 1 such that they do not contact each other and hence that the two semicircular sections can vibrate independently according to different timing schedules and with different intensities.

The radial feeders 25 are troughs disposed radially each with an article receiving end and an article delivery end and supported by a vibrator unit 26 such that the articles received from the dispersion feeder 21 at the article receiving end travel radially outward and delivered to the associated article batch handling unit 30 from the article delivery end. Each article batch handling unit 30 has a pool hopper (PH) 31 at the top below the corresponding radial feeder 25 for temporarily storing an article batch delivered from the article feeding unit 20, a weigh hopper (WH) 32 having an inner gate 33 and an outer gate 34 which are openable and disposed below the pool hopper 31 for receiving the article batch discharged therefrom to have it weighed, and a memory hopper (MH) 35 disposed below the weigh hopper 32 such that the article batch discharged from the weigh hopper 32 by opening its inner gate 33 is received thereby but that the article batch discharged from the weigh hopper 32 by opening its outer gate 34 is not received thereby but is discharged directly into a chute system 40 disposed below the article hatch handling units 30.

The chute system 40 is basically for collecting the article batches discharged from a selected combination of article batch handling units 30 so as to be packaged together by a packaging unit (not shown). For the purpose of independent operations of Group 1 and Group 2, the chute system 40 is also comprised of two chute units forming independent discharge routes such that article batches discharged from different groups can be collected separately. Each chute unit is separable into an upper chute 41 and a lower chute 42 such that the chute system 40 can be disassembled easily for cleaning. In FIG. 1, numeral 12 indicates a main frame of the weigher 10 and the lower chutes 42 are removably attached to the main frame 12 by brackets. The upper chutes 41 are partitioned into a plurality of sections (such as three) in the circumferential direction, as disclosed in Japanese Patent Publication Kokai No. 60-183831, and also removably attached to supporting members (not shown).

Figure 3:
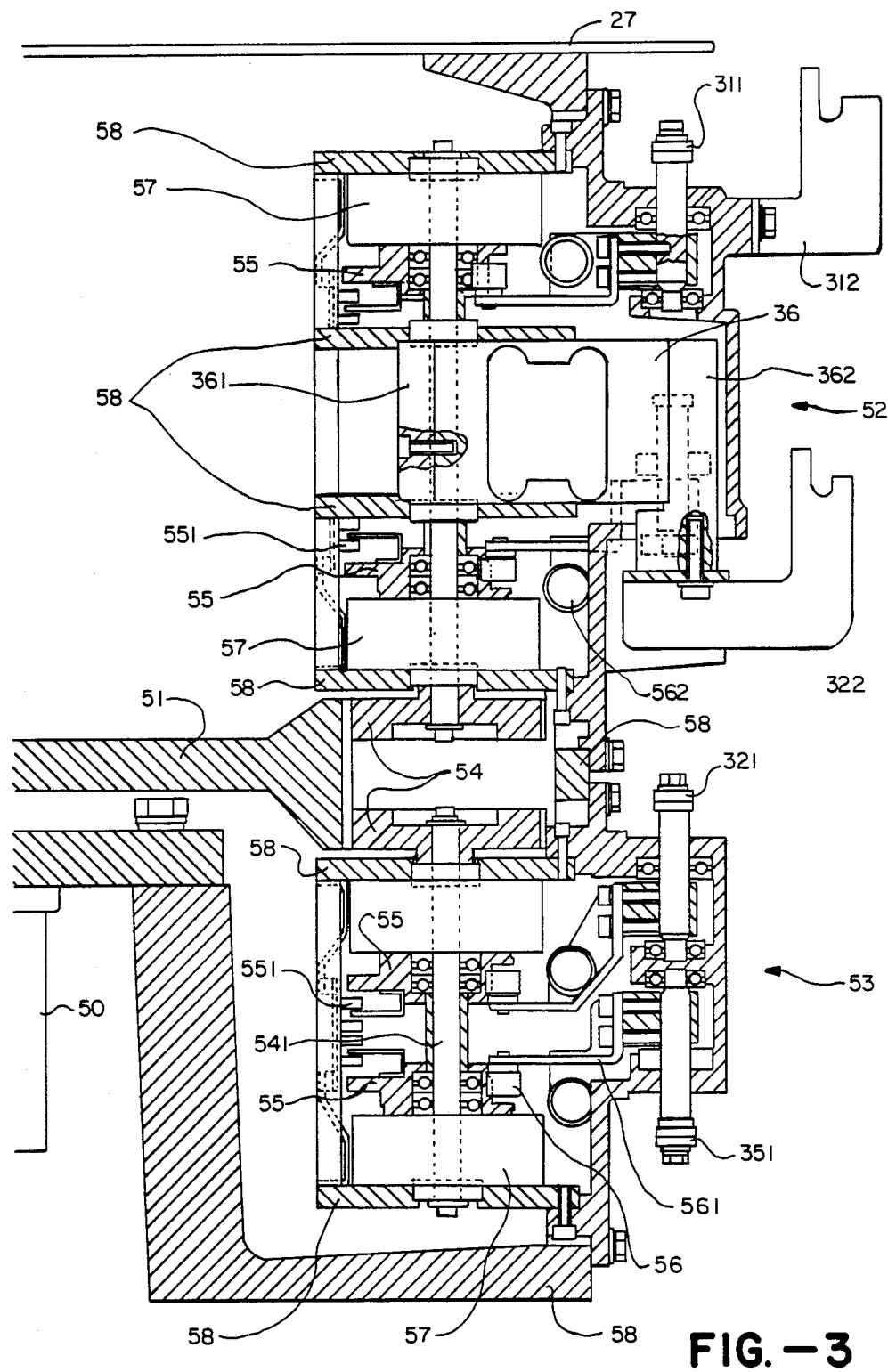
FIG. 3 is a drawing for showing the mechanism for opening the gates of the hoppers of the weigher of FIG. 1.

FIG. 3 shows the mechanism for opening the gates of the hoppers 31, 32 and 35 of each article batch handling unit 30 by transmitting the rotary motion of a hopper-driving motor 50 to their respective push rods. Since there is nothing special about the manners in which the hoppers 31, 32 and 35 are supported by the main frame 12, their supporting mechanisms are not illustrated in FIG. 1 or FIG. 3. The hopper-driving motor 50 is disposed at the center below the dispersion feeder 21 and a center gear 51 is affixed axially to the shaft of the motor 50. Two drive units, which are vertically arranged with respect to each other and hence are referred to as an upper drive unit 52 and a lower drive unit 53, are associated with each of the article batch handling unit 30. Each of the drive units 52 and 53 is of a double structure, the upper drive unit 52 being used for driving the gate of the pool hopper 31 and the outer gate 34 of the weigh hopper 32 and the lower drive unit 53 being used for driving the inner gate 33 of the weigh hopper 32 and the gate of the memory hopper 35. Each of the drive units 52 and 53 is provided with a pinion 54 which has a shaft 541 and engages with the center gear 51 and is substantially of the same structure as the drive unit of the combinational weigher Model CCW-S-2XX manufactured and sold by the assignee corporation and as described in U.S. Pat. No. 4,708,215 which is hereby incorporated by reference. Model CCW-S-2XX of the assignee corporation does not use any memory hoppers and its weigh hoppers are of a single-gate type. Thus, the hopper gates of each of its article batch handling units can be controlled by one drive unit of such a double structure. One of the advantages of using two such drive units to independently operate the four hopper gates of each article batch handling unit according to this embodiment of the present invention is that upper drive units of the same design as described herein can be used in weighers designed without memory hoppers. In other words, if the upper drive unit 52 and lower drive unit 53 are unistructurally combined, it may not be possible to easily or profitably incorporate such combined drive units with another weigher of a different design. In FIG. 3, numeral 55 indicates cams, numeral 56 indicates cam rollers, or cam followers, in contact with the cams 55 and connected through cam levers 561 to gate-opening levers (such as pool hopper lever 311, weigh hopper lever 321 and memory hopper lever 351) for opening the associated hopper gates, numeral 562 indicates a cam spring, numeral 57 indicates clutches and electromagnetic brakes for controlling the rotation of the cams 55 around the axes of rotation of the pinions 54 and numeral 36 indicates a load cell (LC) with which the weight of the article batch in the weigh hopper 32 is measured. The load cell 36 is supported at a base 361 and is connected to the associated weigh hopper (not shown in FIG. 3) through a load cell bracket 362 and a weigh hopper hanger assembly 322. Numeral 312 indicates a pool hopper hanger assembly. Numerals 551 indicate cam sensors of a known kind for detecting the angular positions of the cams 55. The cam sensors 551 are each secured through a sensor bracket to one of holder plates 58. Numerals 27 and 58 respectively indicate a base for the feeder unit and a case for the drive unit. U.S. Pat. No. 4,708,215 is to be referenced for a detailed explanation of the drive units 52 and 53.

The weigher 10 described above uses a circuit board which is essentially identical to that for aforementioned Model CCW-S-2XX of the assignee corporation. Thus, aforementioned U.S. Pat. No. 4,694,920 which describes its electrical system is hereby incorporated by reference and the electrical structure of the weigher 10 is described below ony briefly with reference to FIG. 4 which is its schematic block diagram.

Figure 4:
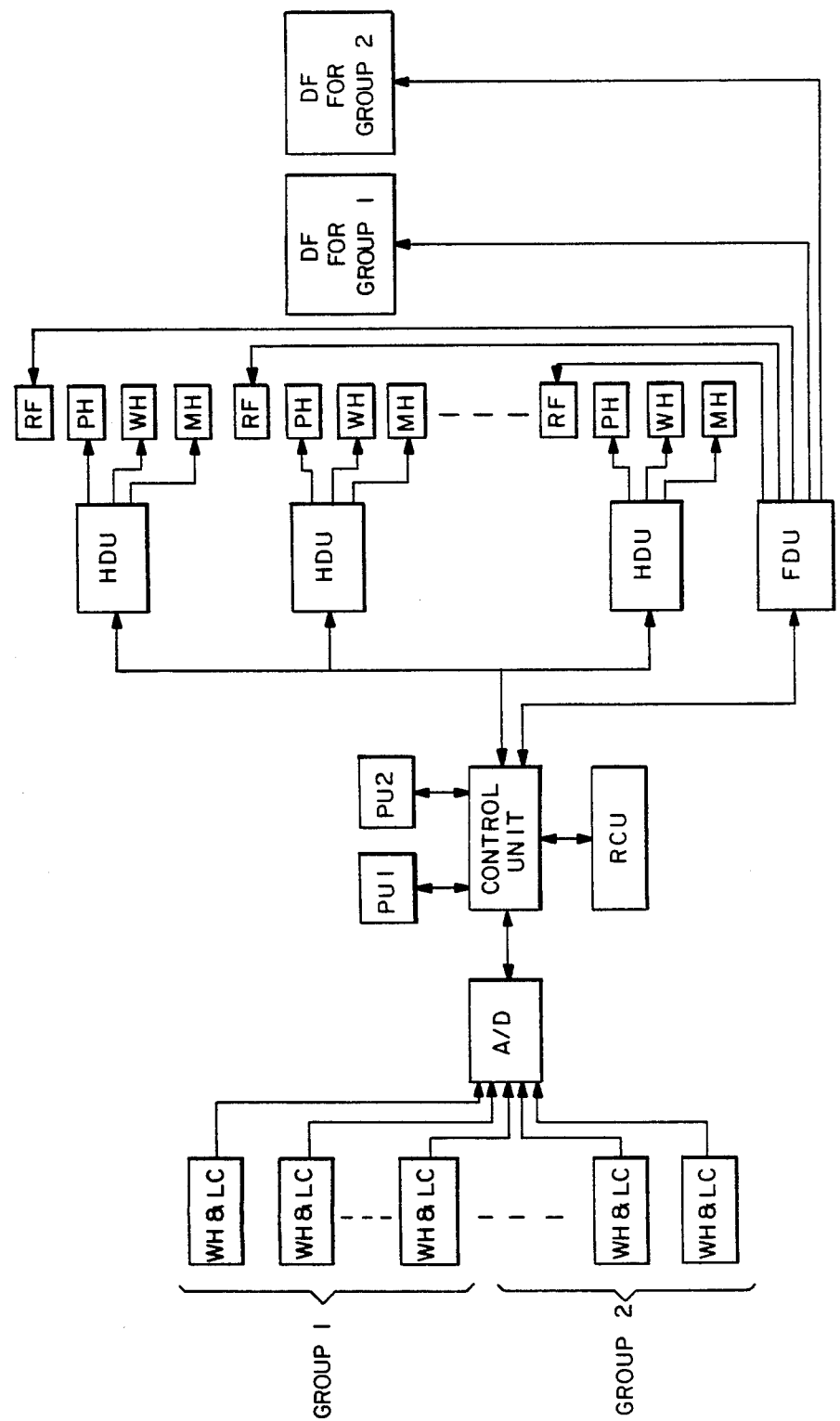
FIG. 4 is a block diagram of the electrical system of the weigher of FIG. 1, FIGS. 5-9, 10A, 10B, 10C and 11-14 are flow charts of a program for the computer which controls the operation of the weigher of FIGS. 1-4, FIGS. 15A and 15B are respectively a partially broken top view and a side view of one of the table units of a dispersion feeder divisible into two parts.

In FIG. 4, numeral 61 broadly indicates the weighing means (WH and LC) individually associated with the sixteen article batch handling units 30, each outputting a weight signal indicative of the weight of the article batch in its weigh hopper 32 measured by its load cell 36. The weight signals outputted therefrom are amplified and filtered in known manners. Numeral 62 broadly indicates an analog-to-digital conversion means (A/D) for accepting these amplified and filtered weight signals sequentially by means of a multiplexer and converting them into digital signals by means of an analog-to-digital converter. Numeral 65 indicates a control unit including a computer for controlling overall operations of the weigher 10. As will be explained in detail below, this computer not only performs combinational calculations to select a combination of weight values and keeps monitoring the weights of the article batches but also controls the operations of various hopper gates through individual hopper drive units (HDU) 67 and dispersion and radial feeders 21 and 25 through a feeder drive unit (FDU) 68. Since the dispersion feeders 21 corresponding to Groups 1 and 2 may have to be driven independently of each other, they are separately connected to the feeder drive unit 28 as shown in FIG. 4. Numeral 69 indicates a remote control unit (RCU) through which the user may not only set various parameters but assign article batch handling units 30 into Groups 1 and 2 and through which various data may be outputted. PU1 and PU2 indicate packaging units adapted to receive and package article batches discharged from article batch handling units of Groups 1 and 2, respectively.

The operation of the computer in the main control unit 65, or the sequence according to which this computer is programmed to operate, is explained next by way of flow charts. Briefly outlined, as shown in FIG. 5, the computer initially analyzes the overall condition of the weigher 10 by examining error data and condition flags to be explained in detail below. It then checks whether the system, inclusive of the packaging units PU1 and PU2 connected thereto, is ready for operation (Subroutine TIMING CHECK shown in FIG. 6). If the system is ready, combinational computations (abbreviated as CC in the flow charts) are performed and a combination is selected (Subroutine WEIGH shown in FIG. 7). Then, the conditions of the hoppers are examined and some article batches are discharged from weigh hoppers to memory hoppers (Subroutine WH CHECK shown in FIG. 14). Thereafter, the computer analyzes input data from the remote control unit 69 and output data to be transmitted thereto and the article feeding unit 20 is controlled by weight signals received from the individual weigh hoppers. A bucket conveyer (not shown) for supplying articles to the article feeding unit 20 is controlled by output signals from weight sensors supporting the dispersion feeder 21.

In Subroutine TIMING CHECK, as shown in FIG. 6, the computer checks whether or not the packaging units PU1 and PU2 are ready to receive discharged article batches from the article batch handling units 30 and whether or not Groups 1 and 2 are ready for combinational calculations. Each packaging unit is adapted to transmit a signal, when it is ready, to the computer (through an I/O control means) by setting a request flag and the computer, in turn, determines the conditions of the packaging units by checking these flags. Similarly, the computer checks flags which indicate whether combinational computations can be started for Groups 1 and 2.

Figures 7, 8:
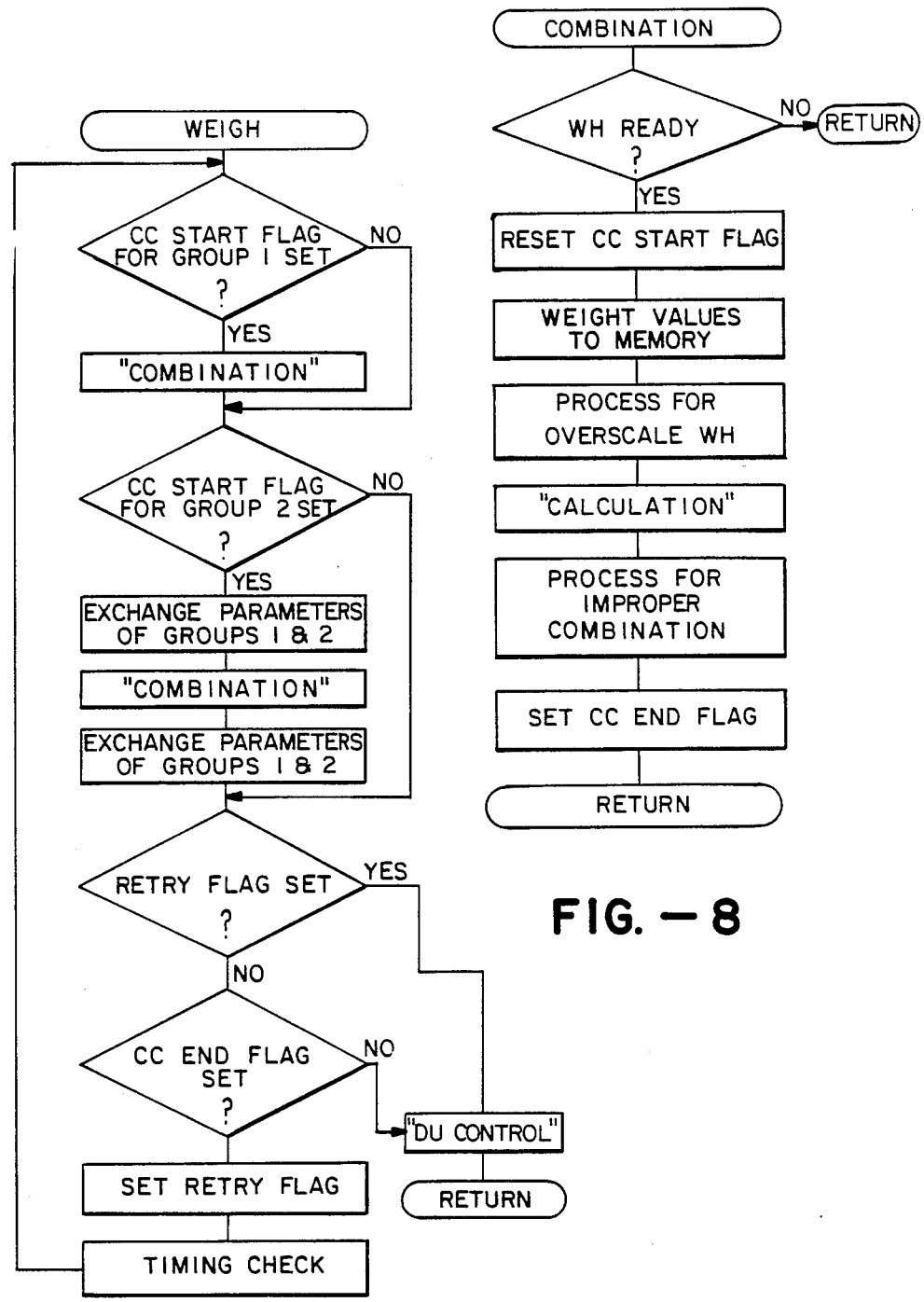

In Subroutine WEIGH in the flow chart of FIG. 5, as shown in FIG. 7, combinational computations are performed for Group 1 by Subroutine COMBINATION shown in FIG. 8 and explained below, if the aforementioned start flag for Group 1 is set. If the start flag for Group 1 is reset but that for Group 2 is set, Subroutine COMBINATION is run for Group 2 by first replacing the parameters for Group 1 by those of Group 2 because the weigher 10 of the present invention allows Groups 1 and 2 to operate completely independently as explained above as one major characteristic of the present invention. The parameters for the combinational computations include not only the target weight and the upper and lower allowable limits but also determinations such as whether zero and/or span adjustments should be carried out, whether the target weight should be aimed to be reached by one combinational weighing or in a plurality of steps, etc. Since Groups 1 and 2 are allowed to operate independently and since there may therefore occur a situation wherein, for example, the flag requesting a discharge of article batches to the second packaging unit is set while combinational computations for Group 1 are being carried out, a flag (referred to herein as the "retry flag") is provided such that Subroutine TIMING CHECK is repeated again and combinational computations for Group 2 can be started immediately in such a situation. At the end, the hopper and feeder driver units 67 and 68 are operated (by Subroutine DU CONTROL shown in FIG. 11).

Subroutine COMBINATION starts, as shown in FIG. 8, only after a certain preset time has elapsed such that the weight signals from the weigh hoppers have stabilized. After the start flag for combinational computations is reset, weight data corresponding to the group under consideration are transferred into a memory device connected to the computer and if any of the weigh hoppers is found to be in the so-called overscale condition, a predetermined appropriate procedure is followed as explained in U.S. Pat. No. 4,694,920 such as outputting an alarm and/or stopping the operation. An overscale condition arises when an excessive amount of articles has been delivered to a weigh hopper or, more precisely, when the weight of an article batch in a weigh hopper exceeds the sum of the target weight value and the upper limit (the maximum allowable upward deviation from the target weight value). After a combination is tentatively selected by Subroutine CALCULATION (shown in FIG. 9), it is examined whether the selected combination is proper in that it gives a total weight within allowable limits and if it is found to be improper, a remedial process is carried out as explained in U.S. Pat. No. 4,694,920. If the selected combination is too heavy, for example, the article batches may be dumped or the operation may be stopped. If the selected combination is too light, weigh hoppers which are excessively light may be identified and articles may be added thereto.

Subroutine CALCULATION is explained next in detail by way of the flow chart of FIG. 9 but reference may also be made to U.S. Pat. Nos. 4,454,924 and 4,560,015 which disclose some basic principles related to the use of memory hoppers. Memory hoppers are also called storage hoppers and serve to temporarily store the article batch discharged from the associated weigh hopper such that the weigh hopper can receive a new article batch with a new weight value which can be additionally considered in the next cycle of combinational computations. Thus, it is generally desirable to discharge an article batch not only from a hopper which has not discharged for a longer time than the others but also from a memory hopper rather than a weigh hopper, if there is a choice. For this reason, not only is a priority number counted for each memory and weigh hopper, indicating the number of consecutive cycles of operation during which the associated hopper has not been discharged, but a specified handicap number is added to the priority numbers of the memory hoppers belonging to the group being processed. Those of the memory and weigh hoppers of the selected group which should be prevented from participating in the combinational computations are assigned a value of zero as their priority value because the higher the priority value, the higher the priority. Hoppers which cannot participate include those in an overscale condition, those which are too light or empty, those which were deactivated from the remote control unit 69 for whatever reason, and those which are not considered to have stabilized.

Next, ten weight values $W_1, \ldots W_{10}$ from the memory and weigh hoppers of the selected group are arranged in the order of priority. According to the embodiment of Subroutine CALCULATION presented herein, attempts are made to combine only four or less of the weight values of article batches to obtain a total weight such that they can be selected for packaging. In other words, even if a "better" combination (such as one which gives a total weight closer to the target value) is obtainable from five or more of the weight values, such a combination is not selected. The reason behind this choice is that a stable continuous operation of the weigher is more important than accuracy in weighing because the overall accuracy (average level of accuracy over many cycles of operation) improves if the operation of the weigher can be stably maintained even if its accuracy drops temporarily. If five or more weight values are required to obtain an optimum combination, it may be interpreted that articles are not being supplied sufficiently, or that the individual article batches are too small. If such a situation is treated as normal, the situation will not improve by itself but will become worse.

Thus, if m is the number of these weight values which are non-zero, a first pattern counter with four bits and a second pattern counter with (m−4) bits are prepared and each of these two counters is set to its maximum value (for example, by setting each bit of the counters to "1"). If only one of 10 weight values is zero, for example, there will be one 4-bit counter with four "1"s and one 5-bit counter with five "1"s.

Next, the sums of combinations of the four weight values $W_1, \ldots W_4$ with highest priority numbers are calculated sequentially in the order of the output from the first pattern counter and the sums $W_{ci}$ (i=1, 2, ...) thus obtained are stored in a specified memory area (hereinafter referred to as Memory 1) at addresses given by the corresponding counter output. Since the output pattern of the first counter is (1,1,1,1), (1,1,1,0), (1,1,0,1), ... in binary notation, or 0F, 0E, 0D, ... in hexadecimal notation, $W_1 + W_2 + W_3 + W_4 = W_{c1}$ is stored at Address 0F, $W_1 + W_2 + W_3 = W_{c2}$ is stored at Address 0E, and so forth. A similar routine is thereafter repeated with those of the remaining six weight values $W_5 \ldots W_{10}$ which are non-zero and the combined weight values $W_{ci}$ (i=1, 2, ...) similarly obtained sequentially according to the output from the second pattern counter are stored in what will hereinafter be referred to as Memory 2.

Next, the following deviation values are determined and stored in specified areas hereinafter referred to as CBDV1, ... CBDV4 (ComBination DeViation). The value stored in CBDV1 is the smallest of the deviations from the target value of the sums which are greater than or equal to the target value and correspond to a combination of four or less of the non-zero weight values $W_i$. The value stored in CBDV2 is the smallest of the deviations from the target value of the sums which are greater than or equal to the target value and correspond to a combination of five or more of the non-zero weight values $W_i$. The values stored in CBDV3 is the smallest of the deviations from the target value of the sums which are less than the target value and correspond to a combination of four or less of the non-zero weight values $W_i$. The value stored in CBDV4 is the smallest of the deviations from the target value of the sums which are less than the target value and correspond to a combination of five or more of the non-zero weight values $W_i$. This is accomplished by first entering a maximum value in each of these areas (such as $65535 = 2^{16} - 1$ in the case of a 16-bit register), calculating the deviation (DEV) of each sum $W_c$ both from Memory 1 and Memory 2 sequentially and using Subroutine COMBINATION CHECK illustrated in FIG. 10. The combination of article batch handling units from which article batches are to be discharged is finally determined from the values stored in the areas CBDV1–CBDV4, depending on whether or not the weigher is being operated under a condition that combinations giving a sum which is less than the target value are allowed to be selected and also depending on whether or not such a selectable combination of four or less weight values (or article batch handling units) is present because, as mentioned above, no combination of five or more weight values is selected as long as there is a selectable combination of four or less weight values according to the embodiment of the present invention being considered. If it does not matter whether the total weight of the discharged article batches is greater or less than the target value, for example, both the contents of CBDV1 and CBDV3 are considered to select the final combination but if there is no such combination of four or less weight values, the contents of CBDV2 and CBDV4 are compared. If the total weight to be selected must not be less than the total target value, the selection is made by examining only the contents of CBDV1 and CBDV2. After a combination is selected, drive flags are set for the corresponding weigh and memory hoppers to be discharged as well as for the corresponding pool hoppers and radial feeders.

Figure 10A:
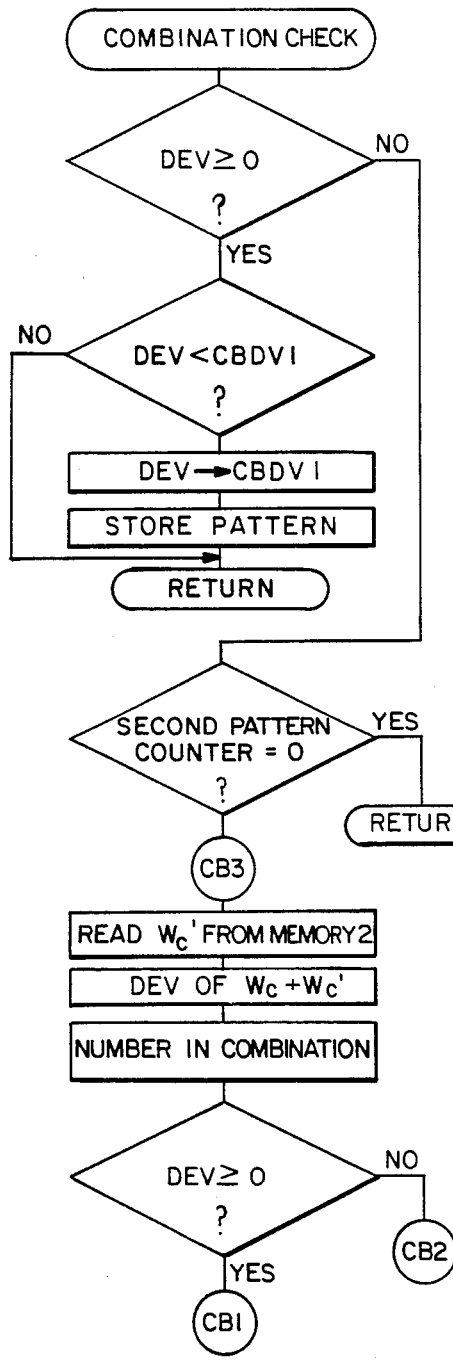
Figure 10B:
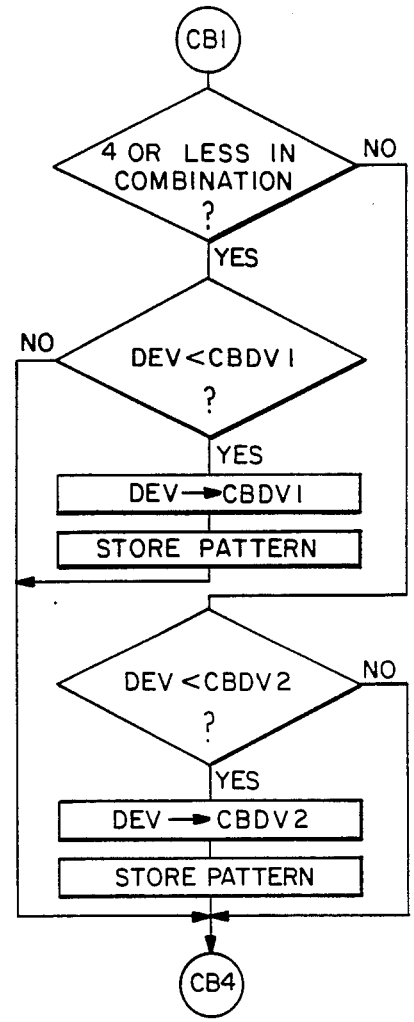
Figure 10C:
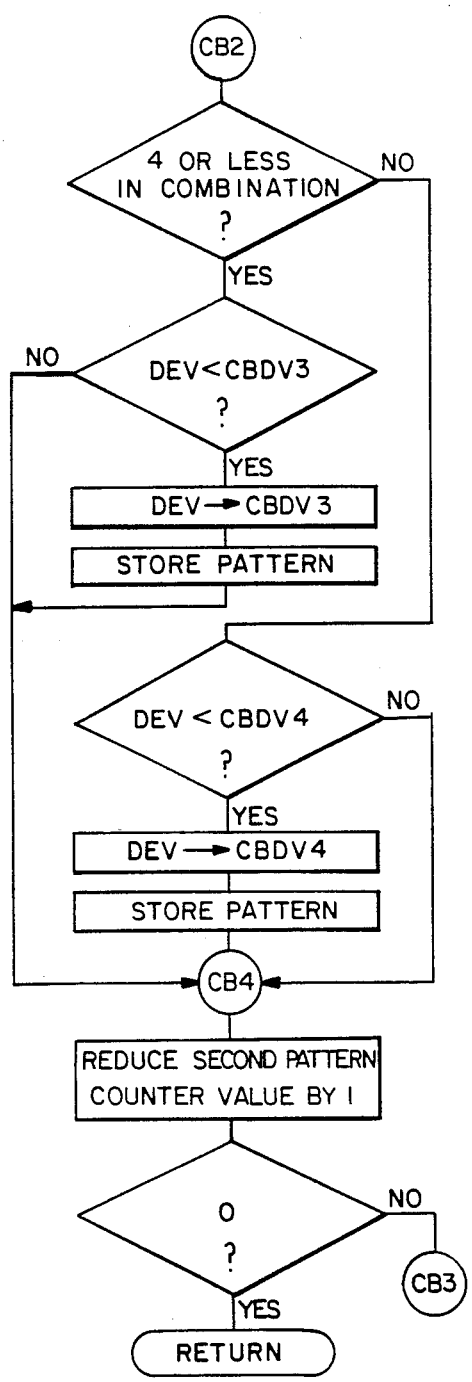

To briefly explain the structure of Subroutine COMBINATION CHECK illustrated in FIG. 10, if the deviation (DEV) under consideration is zero or positive, its value is compared with the value already stored in CBDV1, with the smaller of the two becoming stored in CBDV1, and the corresponding 4-bit counter pattern corresponding to this value of deviation (for example, "1010") is entered into the highest four digits of a 10-bit memory area, the remaining six bits at the lower end remaining as "0" (such that "1010000000" will be stored in this case). If the deviation under consideration is negative and the value of the second pattern counter is currently not zero, the sum $W_c'$ is read from Memory 2 corresponding to this currently non-zero output of the second pattern counter and $(W_c + W_c')$ is compared with the target value to obtain a new deviation. If the deviation (DEV) thus calculated is greater than or equal to zero and the sum $(W_c + W_c')$ is from a combination of four or less weight values, the value CBDV1 may or may not be updated as explained above. If this deviation is greater than or equal to zero but the aforementioned sum is from a combination of five or more weight values, on the other hand, the deviation is compared with the value stored in CBDV2 and if the deviation is smaller, its value replaces the number hitherto stored in CBDV2 and the current output from the second pattern counter is entered in the aforementioned 10-bit memory area after the aforementioned 4-bit counter pattern indicating the combination corresponding to the value stored in CBDV1. If the first pattern counter has four bits and the second pattern counter five bits, as in the example considered above, and if the current output of the second pattern counter is "01100", for example, while the current content of CBDV1 corresponds to "1010" as in the example considered above, the 10-bit memory area will then be "1010011000", the tenth bit being forced to remain as "0".

If the deviation being considered now is less than zero, it is compared similarly with the value contained in CBDV3 or CBDV4, depending on whether four or less weight values are added together or not. In this manner, the contents of CBDV3 and CBDv4 converge to final values and the 10-bit memory area records the corresponding counter patterns, indicating by "1" which of the hoppers have been selected.

If the target weight is 100 g, for example, and if it is attempted to select four weight values for combination as explained above, the average weight value should be about $100/4 = 25$ g. If the articles weighed are not supplied at a uniform rate, however, a situation may arise wherein the weight values of the article batches in the weigh and memory hoppers within the same article batch handling unit do not add up to such an expected average value. Once a situation like this occurs, these hoppers are not likely to be selected by the combinational computations and the article batches stored therein may stay without being discharged for many cycles of combinational computations. Such an occurrence clearly affects the efficiency of weigher operation adversely because it will probably become necessary to select a large number of hoppers than four as intended. In order to avoid such a situation, a subroutine hereinafter referred to as Subroutine ADD TO MH and illustrated by a flow chart in FIG. 12 is incorporated in the operation of the weigher of the present invention. As shown in FIG. 11, this subroutine is used immediately after it is ascertained that a selection has been made either in Group or Group 2, that is, as soon as it is ascertained that the flag indicative of the end of combinational computations for either group is in reset condition. In other words, an undersupplied condition in any of the article batch handling units is detected as soon as it occurs according to the present invention without waiting for its ill-effects may appear.

Figure 13:
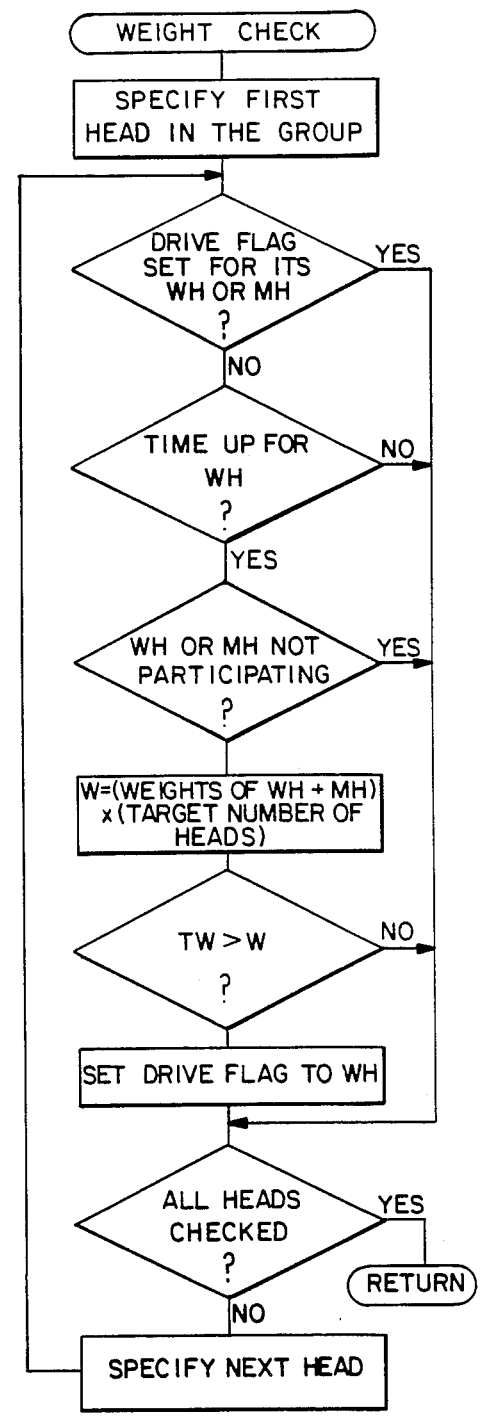

In FIG. 12, TW1 and TW2 are target weights and UW1 and UW2 are the upper limits (the maximum allowable upward deviations from the target weights) set for Groups 1 and 2, respectively. Thus, as can be seen from FIGS. 12 and 13, whenever a selection has been made in either of the groups, a search is started within that group for an article batch handling unit (head) which is in the aforementioned undesirable condition. More in detail, if an article batch handling unit belonging to the group in consideration is found to satisfy all the conditions in Subroutine WEIGHT CHECK shown in FIG. 13, the article batch in its weigh hopper is discharged into the memory hopper below to make a single combined batch. These conditions require firstly that the drive flags for both of these hoppers are reset, secondly that the weigh hopper has been stabilized (according to the elapsed time) and thirdly, that both hoppers are participating in the combinational computations. The fourth condition is for preventing the combined weight, after the article batch in the weigh hopper is discharged into the memory hopper, from exceeding a certain maximum threshold value. By "target number of heads" in FIG. 13 is meant the desired number of heads to be selected. In the example above, this number is four and the subroutine in FIG. 13 requires, if the target value is 100 g and the maximum allowable upward deviation (UW) is 4 g, the article batch in the weigh hopper is not discharged into the memory hopper unless the total weight of the article batches in these hoppers is less than $(100+4/2)/4=25.5$ g. With the use of this subroutine, the weigher of the present invention can prevent the occurrence of combinations of a weigh hopper and a memory hopper within the same article batch handling unit which are undersupplied to such an extent that an efficient operation of the system is likely to be inhibited.

Subroutine DU CONTROL, after such undersupplied combinations of weigh hoppers and memory hoppers have been taken care of by Subroutine ADD TO MH, continues to control the operations of the other movable parts, as shown in FIG. 11, by setting drive flags for the corresponding pool hoppers and radial feeders to supply additional article batches to the article batch handling units processed by Subroutine ADD TO MH. Moreover, this subroutine also checks whether any of the article batch handling units requires a zero-point adjustment and, if there is one, resets the drive flag for its pool hopper such that no article batch will be discharged into its weigh hopper for the next cycle and a zero-point adjustment operation can be carried out by a preprogrammed routine such as disclosed in U.S. Pat. No. 4,694,920. If any article batch handling units are specified for additional supplies of articles, drive flags are set for their pool hoppers and radial feeders and all these flag data are loaded into an I/O memory (not shown) for driving the corresponding moving parts (hoppers and feeders). Timers are started for driving these moving parts according to their timing schedules such that the weigh hoppers will output stabilized weight signals and the memory hoppers are opened at correct times. For those memory hoppers for which the drive flag has been set, the weight is cleared and an empty flag is set. Next, if Subroutine ADD TO MH has found an article batch handling unit satisfying the conditions in Subroutine WEIGHT CHECK, the condition flag for the weigh hopper in such an article batch handling unit is set equal to the condition flag of the corresponding memory hopper and the combined weight of the article batches in them is entered as the weight of the single article batch to be combined inside the memory hopper. By the condition flag is meant a flag adapted to indicate, for example, whether the associated hopper is in the overscale condition, empty or deactivated. Thereafter, the priority values of these selected article batch handling units are reset while those of the non-selected article batch handling units are increased by one such that their chances of being selected in the next cycle increases, as explained above. Subroutine DU CONTROL is operated for whichever group for which the combinational computation end flag is set. If the flags for both groups are set, it is run for both.

Next Subroutine WH CHECK is used to check the conditions of the weigh hoppers of all article batch handling units to control the supply of article batches therefrom to the corresponding memory hoppers. As shown in FIG. 14, this subroutine is run only once every four cycles of the main program which is much slower. The flow chart of this subroutine in FIG. 14, which should be otherwise self-explanatory, shows that each article batch handling unit is examined to determine whether its memory hopper timer is up and hence the corresponding memory hopper is closed, the weigh and memory hoppers are not deactivated, for example, for being disconnected to be repaired, the weigh hopper timer is up and hence the weigh hopper is stabilized, and the memory hopper has just discharged its article batch and has an empty flag set. Data on such article batch handling units are stored in the main memory of the computer and the article batch handling units are examined again to determine if their weigh hoppers are stabilized and if zero-point adjustment has been requested. Drive flags are set only regarding the remaining article batch handling units for their pool hoppers, weigh hoppers and radial feeders and they are operated according to their individual timing schedules. Thus, article batches are supplied to the empty and closed memory hoppers and as soon as the gates of the corresponding weigh hoppers are closed, new article batches are supplied into them from their corresponding pool hoppers and timers are started for the weigh and memory hoppers for which the drive flag has been set. As article batches are discharged from weigh hoppers to memory hoppers, their condition flags and weight data are changed accordingly and the priority numbers of the hoppers are also updated as explained above.

Figure 15A:
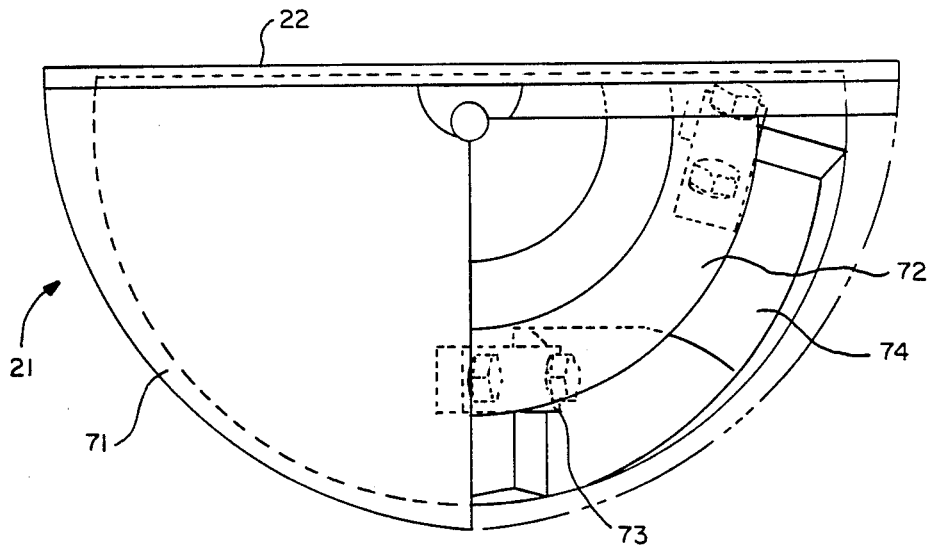
Figure 15B:
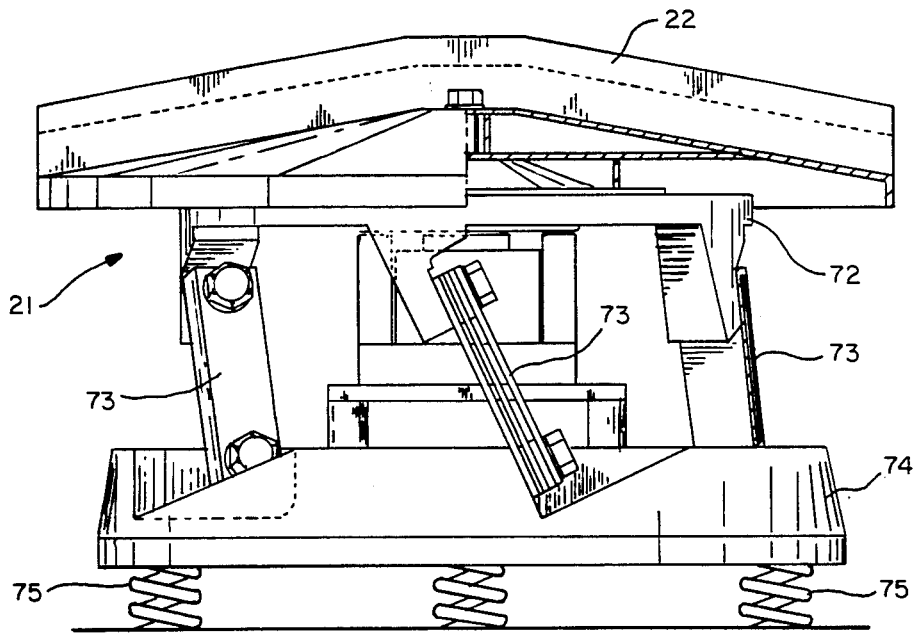

The foregoing description of a preferred embodiment of the invention has been presented for purposes of illustration. It is not intended to be exhaustive or to limit the invention to the precise form disclosed, and many modifications and variations are possible in light of the above teaching. Firstly, although the present invention was described above by way of an example with sixteen article batch handling units divided into two groups of eight each, this is not intended to limit the scope of the present invention. For example, the article batch handling units may be divided into three or more groups. The user has the freedom of selecting the number of groups and also of assigning article batch handling units to the individual groups. The dispersion feeder 21 may also be divided into three or more parts (table units) although FIGS. 1 and 2 show a situation where a single partition 22 divides the dispersion feeder 21 into two parts. FIGS. 15A and 15B show more in detail one of the table units of a dispersion feeder 21 divisible into two parts. Its conical table top 71 is affixed to an upper base 72 which is supported by a plurality of leaf springs 73 attached to a lower base 74 such that it can be controllably vibrated by the vibrator 23. The structure of the partition was described above in connection with FIG. 1.

If the dispersion feeder 21 is divided into three parts and if it is desired that each of the three parts should operate independently, for example, with different operation cycles, the dispersion feeder 21 must be divided into three table units which can be independently controlled. One of such table units is shown in FIGS. 16A and 16B wherein components which are substantially identical or at least similar to those shown in and explained in connection with FIGS. 15A and 15B are indicated by the same numerals. In FIG. 16A, numeral 76 indicates the position of the point around which the table top 71 vibrates rotationally. As explained above, the vibrator 23 also serves to vertically vibrate the table top 21. FIG. 16C shows how the partition plates 22 of mutually adjacent table units fold over without touching one another such that each table unit can be caused to vibrate individually. Dispersion feeders divisible into four independently controllable table units can be similarly constructed. The entire article feeding unit 20 inclusive not only of the dispersion feeder 21 but also of the individual vibrators 23 for controlling the vibrations of its individual table units is adapted to be replaced by another with a different number of table units, depending on the type of operation desired.

If it is desired to divide the dispersion feeder into three parts but two of them are to be controlled in synchronism with each other and if the desired rates of supply of articles into these parts do not differ significantly, an article feeding unit of the type with two vibrators 23 as shown in FIGS. 1, 15A and 15B. In such a situation, an adjustable partition wall 78 may be provided as shown in FIG. 17 in addition to those of a fixed type (22) described above. Such an adjustable partition wall 78 according to one embodiment of the present invention has a protrusion 79 formed at its lower edge. The corresponding table tops 71 are provided with holes, or indentations, 80 along the periphery thereof such that the adjustable partition wall 78 can be secured by inserting its protrusion 79 engagingly into one of these indentations 80 according to the desired ratio of areas between the divided parts. More than one of such adjustable partition walls 78 may be employed if it is desired to divide the dispersion feeder 21 into four or more parts with some of them being synchronously controlled. In FIG. 17, numeral 81 indicates a bolt for fastening the adjustable partition wall 78 at the center and numeral 82 indicates one of chutes by means of which articles are delivered onto one of the table units. Additional chutes for delivering articles onto the other table units are omitted from FIG. 17 for the sake of clarity. The double-headed arrow in FIG. 17 indicates the directions in which the adjustable partition wall 78 may be moved.

Secondly, a combinational weigher of the present invention may be so programmed that the article batches from selected article batch handling units belonging to different groups can be discharged according to an adjustable timing schedule. This timing control is particularly useful, for example, when it is desired to package together different articles such as candies of different types in each bag. Since discharged articles of different types slide down the chute to the packaging unit below at different speeds, it is possible by properly adjusting the discharge timing of articles from each group to have them either uniformly mixed when they reach the packaging unit or deposited sequentially such that layers may be formed when they are packaged.

To explain this control more in detail by way of an example, the 16 article batch handling units of the weigher shown in FIGS. 1 and 2 may be divided into three independent groups with the use of an appropriate dispersion feeder divided into three mutually partitioned table units for receiving the three different types of articles. These articles of different types are individually weighed as described above with individually set conditions. Only one packaging unit is connected, however, such that the weighed articles discharged from all three groups are packaged together. Combinational computations are started in all groups in response to a signal transmitted from this packaging unit.

The discharge timing schedule for each group, like the other operating and weighing conditions such as the target weight, can be set from the remote controller 69. This may be accomplished, according to one embodiment of the invention, by causing the remote control unit 69 to display "Discharge Timing Lag" and a set of number keys and requesting the user to form thereon a number indicative of the time interval between the end of combinational computations and the beginning of a discharge operation. If the user forms "0" after specifying the item "Discharge Timing Lag", for example, the selected hoppers start discharging their article batches as soon as the combinational computations are completed. If the user inputs 100 msec, there will be a timing lag of 100 msec, and so forth. If articles of three different kinds sliding down the chute at three different speeds are desired to become uniformly mixed in the bags, the discharge timing lag for the articles of the slowest moving kind is set to "0", that for the articles of the second slowest moving kind is set to the number indicative of the difference in traveling time between the two types, and so forth. In this manner, the articles of three different types traveling at three different rates are likely to reach the packaging unit at the same time and hence become uniformly mixed as they are packaged. Similarly, if articles of three different kinds are known to slide down the chute at the same speed, their timing lags may be so differentiated that they arrive at the packaging unit sequentially and form a layered structure inside each package.

Figure 18:
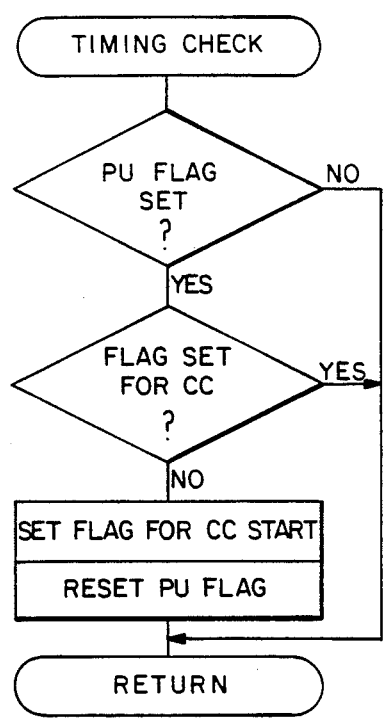
Figure 19:
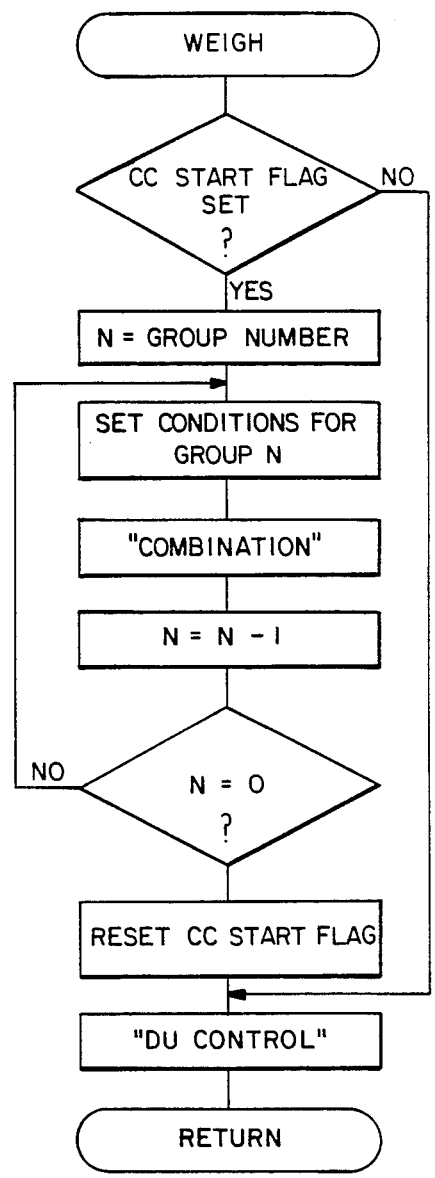
Figure 20:
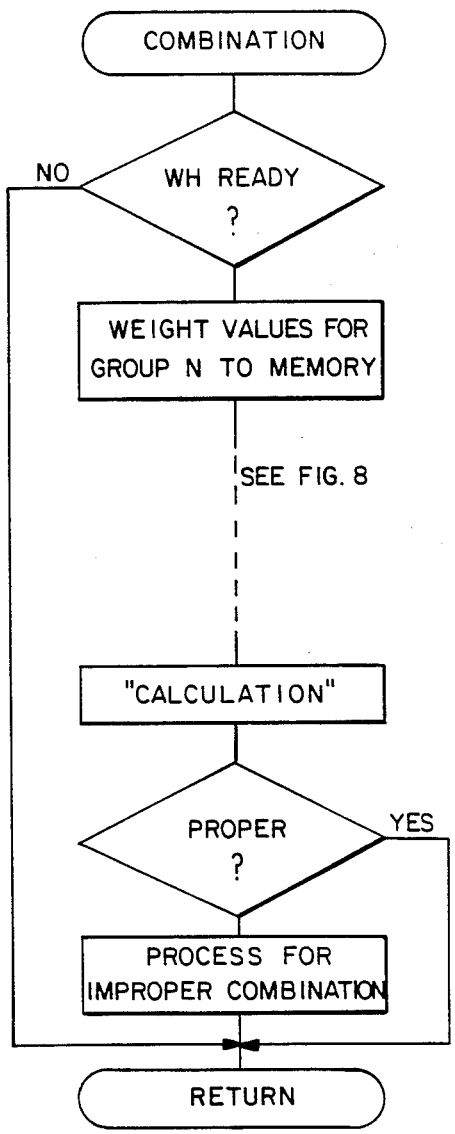

The discharge timing lags inputted from the remote control unit 69 are transmitted to the main computer 65 and stored in a memory device for an input/output controller. Operations of the computer 65 for the control of the mixing described above, or the program therefor, is explained next more in detail by way of the flow charts in FIGS. 18-20. Since only one packaging unit is necessary for this operation and the combinational computations for the three groups handling the three types of articles need not be carried out with different timing schedules, however, some of the subroutines shown in FIGS. 5-14 become much simpler.

Figure 21:
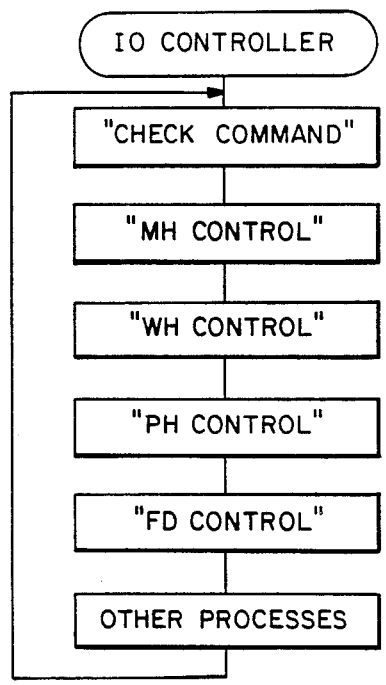
Figure 22:
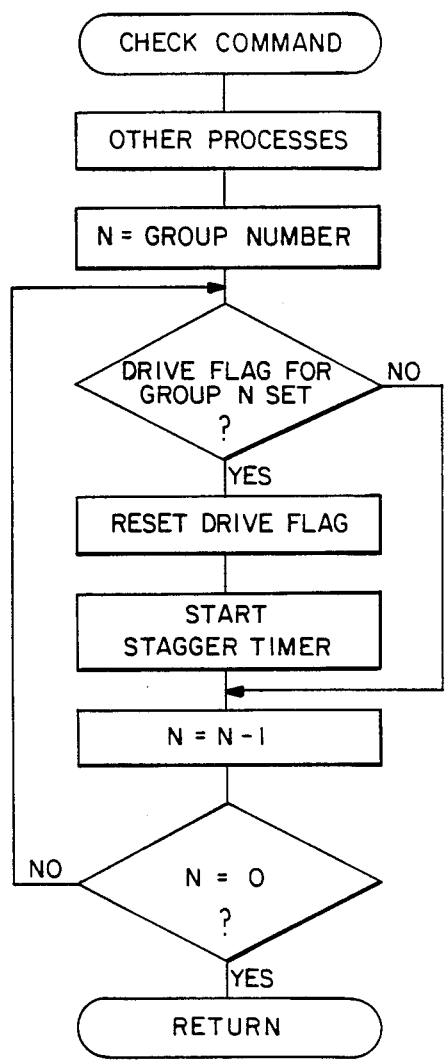

FIGS. 21-26 are flow charts of an I/O controller program according to which the main computer 65 controls the operations of hoppers in view of the discharge timing lags which have been set for the individual groups as explained above. FIG. 21 shows the principal structure of this program and subroutines used therein are shown in FIGS. 22-26. This I/0 controller program may be executed either sequentially with the main program shown in FIGS. 5-14 (for example, between Subroutines WEIGH and WH CHECK with reference to FIG. 5) or concurrently therewith by interrupts, time sharing or the like.

In Subroutine CHECK COMMAND, the hopper drive flags of the individual groups are sequentially examined and, if it is found that a drive flag corresponding to a certain group is set, a stagger timer for that group is started. By the stagger timer for a group is meant a timer which outputs a time-up signal after the discharge timing lag set for that group. These stagger timers for the individual groups are monitored by Subroutines MH CONTROL and WH CONTROL as shown in FIGS. 23 and 24 and when, for example, the time-up signal for a group is outputted, the memory hoppers and/or weigh hoppers of the then selected combination for that group are discharged.

Delay timers are also provided for the pool hoppers and feeder drive units (referred to as PH and FD delay timers in FIGS. 25 and 26, respectively) for the individual groups. Each PH delay timer is started when the stagger timer for the corresponding groups outputs a time-up signal and outputs its own time-up signal after a preset delay time interval between the starting times of operations of the weigh hoppers and pool hoppers of that group. Similarly, each FD delay timer is started when the time-up signal from the PH delay timer for the same group is received and outputs its own time-up signal after another preset delay time interval between the starting times of operations of the pool hoppers and the feeder drive unit of that group. In summary, the stagger timers and the delay timers for the individual groups cooperate to sequentially start the driving operations of the selected hoppers and the feeder drive units of the various groups.

By the WH drive pattern in FIG. 24 is meant the selection whether the inner gate 33 should be opened to discharge the article batch into the corresponding memory hopper as explained above, for example, by way of Subroutine ADD TO MH or the outer gate 34 should be opened to discharge it down to the chute system 40 as a part of the selected combination. Since the operations of the pool hoppers and the feeder drive units are dependent on those of the weigh hoppers of the same group, the same drive patterns as for the weigh hoppers are set for the pool hoppers and the feeder drive units. U.S. Pat. Nos. 4,467,880 and 4,574,897 assigned to the present assignee disclose the technologies of discharging article batches from selected weigh hoppers according to a timing schedule including delays. These delays, however, are introduced for preventing collisions among the articles discharged from different weigh hoppers as they slide down the chute. These prior art technologies do not relate to handling of articles of different types or to consideration of different speeds at which they slide down the chute.

Thirdly, the present invention is applicable not only to combinational weighers and weighing methods but also to combinational counters and counting methods. Combinational weighing and counting are based on the same basic principle and it has been common to describe combinational weighing with the understanding that combinational counting is also included. The present invention is no exception. Minor changes required in the flow charts of FIGS. 5-14 to adapt to the case of combinational counting are well understood by persons skilled in the art of combinational weighing and counting and hence are not included.

Fourthly, the improved methods of the present invention for efficiently operating a combinational weigher of the type having a memory hopper in each article batch handling unit have been described above only in connection with a weigher which is functionally divisible into two independent groups but some of these methods are also applicable to combinational weighers which are not divisible into mutually independent groups such as the method whereby memory hoppers are given higher priority numbers than weigh hoppers and the method whereby article batches in the weigh and memory hoppers within the same article batch handling unit may be combined to form a single batch for preventing undersupplied hoppers from remaining undischarged for many cycles. Such methods as applied to a weigher not divisible into groups can be described by flow charts which are simpler than those shown herein. Such simplified flow charts are not separately shown because a person skilled in the art is expected to be able to create such simpler programs from the more complicated programs described herein for an exemplary weigher divisible into two groups.

It is intended that the scope of the invention described herein be broadly construed.

What is claimed is:

1. A combinational weigher for multiple operations comprising
   A plural N-number of separate article batch handling means for receiving, weighing, storing and discharging individual article batches, said article batch handling means being functionally divisible into a plural n-number of groups,
   article feeding means for feeding individual article batches of up to n different kinds of articles respectively to said n groups of article batch handling means, and
   a control unit with a single computer capable of concurrently controlling mutually independent combinational weighing operations under up to n different sets of operating and weighing conditions.

2. The combinational weigher of claim 1 wherein said article both handling means are disposed in a circular formation around said article feeding means and said article feeding means include a dispersion feeder comprised of a plurality of mutually independent and partitioned table units each having a fan-shaped conical top surface, said table units being individually supported by vibrator means such that said table units can be vibrated independently.

3. The combinational weigher of claim 2 wherein at least one of said table units has a removable partition means for attaching thereto at one of a plurality of attaching positions on the top surface thereof so as to divide said top surface into sections.

4. The combinational weigher of claim 1 wherein each of said article batch handling means includes a weigh hopper for weighing a received article batch to determine a weight value indicative of the weight thereof and discharging said weighed article batch in response to a discharge signal addressed thereto and a memory hopper for accepting and storing said discharged article batch from said weigh hopper and discharging said accepted and stored article batch in response to a discharge signal addressed thereto.

5. The combinational weigher of claim 4 wherein said single computer performs combinational computations from said weight values to select a combination of said weigh and/or memory hoppers and, as soon as an article batch handling means is identified of which the total weight of the article batches in the weigh hopper and memory hopper is less than a predetermined minimum value, causes said weigh hopper of said identified article batch handling means to discharge the article batch therein into said memory hopper of said identified article batch handling means.

6. The combinational weigher of claim 4 wherein said single computer performs combinational computations from said weight values to select a combination of said weigh and/or memory hoppers and assigns priority numbers to at least some of said weigh and memory hoppers based at least in part on data on previous discharge therefrom such that those of said hoppers with a higher priority number are more likely to be selected, said priority numbers being modified such that memory hoppers are more likely to be selected than weigh hoppers.

7. The combinational weigher of claim 6 wherein said article batch handling means are disposed in a circular formation around said article feeding means and said article feeding means include a dispersion feeder comprised of a plurality of mutually independent and partitioned table units each having a fan-shaped conical top surface, said table units being individually supported by vibrator means such that said table units can be vibrated independently.

8. The combinational weigher of claim 6 wherein said single computer performs combinational computations from said weight values to select a combination of said weigh and/or memory hoppers and, as soon as an article batch handling means is identified of which the total weight of the article batches in the weigh hopper and memory hopper is less than a predetermined minimum value, causes said weigh hopper of said identified article batch handling means to discharge the article batch therein into said memory hopper of said identified article batch handling means.

9. The combinational weigher of claim 1 wherein said control unit selects combinations of said article batch handling means according to predetermined criteria and causes said selected combinations to discharge with time lags individually preset for said n groups.

10. The combinational weigher of claim 9 wherein said time lags are preset such that discharged articles from said n groups are sequentially received by a packaging unit connected to said weigher.

11. The combinational weigher of claim 9 wherein said time lags are preset such that discharged articles from said n groups are substantially simultaneously received by a packaging unit connected to said weigher.

12. A combinational weigher comprising
a plurality of separate article batch handling means for receiving, weighing, storing and discharging individual article batches, each of said article batch handling means including a weigh hopper for weighing a received article batch to output a weight signal indicative of the weight of said weighed article batch and discharging said weighed article batch in response to a discharge signal addressed to said weigh hopper and a memory hopper for accepting and storing said discharged article batch from said weigh hopper and discharging said accepted and stored article batch in response to a discharge signal addressed to said memory hopper, and
a control unit for controlling the operation of said weigher, including a computer which performs combinational computations from weight values indicated by said weight signals to select a combination of said weigh and/or memory hoppers and assigns priority numbers to at least some of said weigh and memory hoppers based at least in part on data on previous discharge therefrom such that those of said hoppers with a higher priority number are more likely to be selected, said priority numbers being modified such that memory hoppers are more likely to be selected than weigh hoppers.

13. The combinational weigher of claim 12 wherein said computer modifies said priority numbers of memory hoppers by a predetermined value.

14. The combinational weigher of claim 12 wherein said computer also identifies an article batch handling means of which the total weight of the article batches stored in the weigh and memory hoppers is less than a specified minimum weight value, and causes the weigh hopper of said identified article batch handling means to discharge the article batch therein into said memory hopper thereof.

15. A combinational weigher comprising
a plurality of separate article batch handling means for receiving, weighing, storing and discharging individual article batches, each of said article batch handling means including a weigh hopper for weighing a received article batch to output a weight signal indicative of the weight of said weighed article batch and discharging said weighed article batch in response to a discharge signal addressed to said weigh hopper and a memory hopper for accepting and storing said discharged article batch from said weigh hopper and discharging said accepted and stored article batch in response to a discharge signal addressed to said memory hopper, and
a control unit for controlling the operation of said weigher, including a computer which performs combinational computations from weight values indicated by said weight signals to select a combination of said weigh and/or memory hoppers and, if there is identified an article batch handling means of which the total weight of the article batches stored in the weigh and memory hoppers is less than a specified minimum weight value, causes said weigh hopper of said identified article batch handling means to discharge the article batch therein into said memory hopper of said identified article batch handling means.

* * * * *

UNITED STATES PATENT AND TRADEMARK OFFICE
CERTIFICATE OF CORRECTION

PATENT NO. : 4,844,190

DATED : July 4, 1989

INVENTOR(S) : Mikami et al

It is certified that error appears in the above-identified patent and that said Letters Patent is hereby corrected as shown below:

Claim 2, line 18, change "both" to --batch--.

Signed and Sealed this

Twenty-fifth Day of September, 1990

Attest:

HARRY F. MANBECK, JR.

Attesting Officer    Commissioner of Patents and Trademarks